United States Patent [19]

Takenaka

[11] Patent Number: 5,459,659
[45] Date of Patent: Oct. 17, 1995

[54] ATTITUDE STABILIZATION CONTROL SYSTEM FOR A LEGGED MOBILE ROBOT

[75] Inventor: Toru Takenaka, Saitama, Japan

[73] Assignee: Honda Giken Kogyo Kabushiki Kaisha, Tokyo, Japan

[21] Appl. No.: 67,757

[22] Filed: May 26, 1993

[30] Foreign Application Priority Data

May 29, 1992 [JP] Japan ..................................... 4-164297

[51] Int. Cl.$^6$ ................................................. G05B 17/00
[52] U.S. Cl. ............................... 364/424.02; 364/424.01; 364/151; 364/164; 364/167.01; 180/8.6; 180/8.1; 180/8.2; 318/568.1; 318/568.12; 901/1; 901/9; 901/33; 395/95
[58] Field of Search ............................ 364/424.02, 149, 364/150, 151, 161, 478, 571.01, 191, 424.01, 167.01, 149, 184; 901/1, 9, 46, 50, 47; 180/8.1, 8.2, 8.6; 318/568.12, 568.1; 395/95, 22, 87; 414/1, 5; 250/231.1

[56] References Cited

U.S. PATENT DOCUMENTS

| | | | |
|---|---|---|---|
| 4,213,175 | 7/1980 | Kurihara | 364/119 |
| 4,639,878 | 1/1987 | Day et al. | 364/513 |
| 4,797,835 | 1/1989 | Kurami et al. | 364/513 |
| 5,063,492 | 11/1991 | Yoda et al. | 364/167.01 |
| 5,151,859 | 9/1992 | Yoshino et al. | 364/424.02 |
| 5,159,988 | 11/1992 | Gomi et al. | 180/8.6 |
| 5,206,569 | 4/1993 | Ozawa | 318/568.12 |
| 5,212,632 | 5/1993 | Ito et al. | 364/151 |
| 5,221,883 | 6/1993 | Takenaka et al. | 318/568.12 |
| 5,252,901 | 10/1993 | Ozawa et al. | 318/568.12 |
| 5,255,753 | 10/1993 | Nishikawa et al. | 180/8.6 |

FOREIGN PATENT DOCUMENTS

| | | |
|---|---|---|
| 0251514 | 1/1988 | European Pat. Off. . |
| 62-97005 | 5/1987 | Japan . |
| 150176 | 6/1988 | Japan . |
| 3184782 | 8/1991 | Japan . |

OTHER PUBLICATIONS

EPC Search Report Sep. 1993.
Proceedings of the 29th IEE Conference on Decision and Control (Dec. 5–7, 1990), p. 3310.
Robotics Handbook (Oct. 20, 1990), Robotic Society of Japan pp. 347–348.

*Primary Examiner*—Kevin J. Teska
*Assistant Examiner*—Jacques H. Louis-Jacques
*Attorney, Agent, or Firm*—Lyon & Lyon

[57] ABSTRACT

A system for controlling attitude stabilization of a biped mobile robot having a trunk and two legs each connected to the trunk such that it walks on the ground. The system generates a desired walking pattern of the robot in such a manner that ground reaction force moment acting on the robot when the robot's leg comes into contact with the ground is at a desired position and is provided with a first model made up of an inverted pendulum and simulating dynamics of the robot and a second model simulating the mechanical structure of the robot such that the second model is assumed to walk on the ground in accordance with the desired walking pattern. An inclinatory error of the robot's trunk is detected relative to the second model. A manipulated variable is determined in terms of moment in response to the detected inclinatory error and supplying it to the first model such that the inverted pendulum is rotated about its pivot point by an amount corresponding to the manipulated variable. A positional variation of an upper portion of the inverted pendulum (corresponding to the trunk) is detected, resulting from the rotation therefrom, to correct the motion of the second model in response to the detected positional variation. Robot's joints are controlled to follow the motion of the second model, thereby, the robot can move stably over the ground.

45 Claims, 32 Drawing Sheets

FIG.24

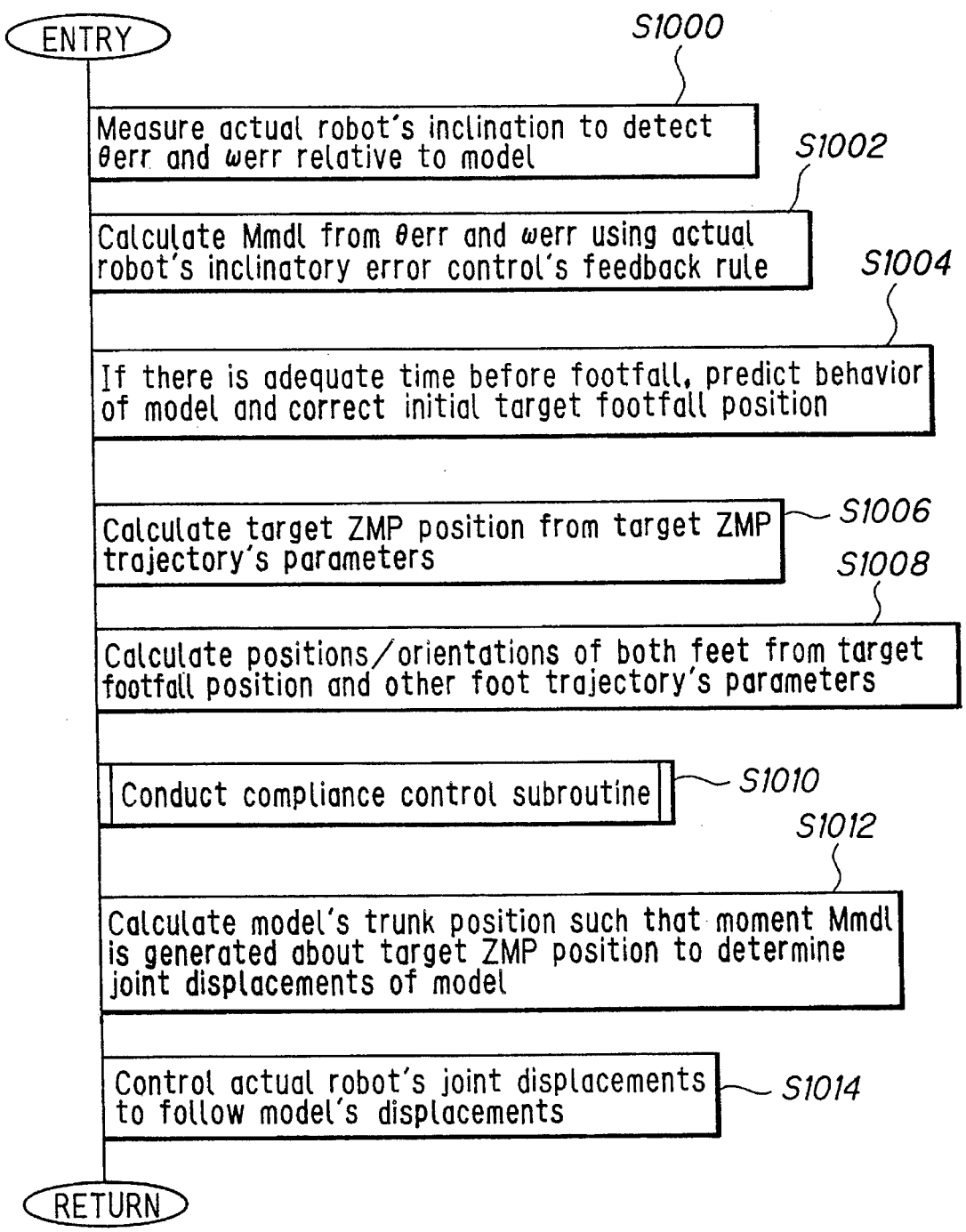

ENTRY

S1000 Measure actual robot's inclination to detect θerr and ωerr relative to model S1002 Calculate Mmdl from θerr and ωerr using actual robot's inclinatory error control's feedback rule S1004 If there is adequate time before footfall, predict behavior of model and correct initial target footfall position S1006 Calculate target ZMP position from target ZMP trajectory's parameters S1008 Calculate positions/orientations of both feet from target footfall position and other foot trajectory's parameters S1010 Conduct compliance control subroutine S1012 Calculate model's trunk position such that moment Mmdl is generated about target ZMP position to determine joint displacements of model S1014 Control actual robot's joint displacements to follow model's displacements

RETURN

ATTITUDE STABILIZATION CONTROL SYSTEM FOR A LEGGED MOBILE ROBOT

BACKGROUND OF THE INVENTION

1. Field of the Invention

This invention relates to an attitude stabilization control system for a legged mobile robot.

2. Description of the Prior Art

Legged mobile robots, in particular legged mobile robots using biped locomotion, are taught by Japanese Laid-open Patent Publication Nos. 62(1987)-97005 and 63(1988)-150176. A general discussion of robots, including legged mobile robots, can be found in Robotics Handbook, Robotic Society of Japan, Oct. 20, 1990.

The stability of legged mobile robots, in particular legged mobile robots using biped locomotion, is intrinsically low. Thus when such a robot is acted on by external forces (disturbance), its attitude easily becomes unstable. Because of this, it is necessary to control the robot's attitude on the basis of the detected inclinatory angle and angular velocity of the robot's trunk. The assignee earlier proposed a technique for enabling such control in Japanese Laid-open Patent Publication No. 4(1992)- 201,187 (which was filed in the United States on Nov. 27, 1991 under the Ser. No. 07/799,367 and filed in the EPO on the same date under the number of 91310964.1). In the proposed system, a number of candidate footfall positions are established beforehand, one of the candidates is selected and the target walking pattern (gait) is switched during the control cycles of each walking step. This control has the following disadvantage. Once ground contactability has been diminished owing to attitude destabilization which causes the ZMP (zero moment point; the center of gravity at which only the vertical ground reaction force acts) to shift to near the limit of the range within which it can exist, it cannot therefore be promptly restored because the ZMP remains near its limit until the attitude is restored by correcting the walking pattern in the next step.

SUMMARY OF THE INVENTION

The object of the invention is therefore to provide an attitude stabilization control system for a legged mobile robot which enables the robot to maintain stable attitude during walking more effectively.

More specifically, for eliminating the drawback of the prior art, the assignee recently proposed an improved control in a Japanese Patent Application filed on Apr. 30, 1992 under the number of Nos. 4(1992)-137,884 to 137,886, one of which is being filed in the United States. In this technique, a target walking pattern (gait) is generated which defines the ground reaction force so as to ensure a state of dynamic equilibrium based on the robot's dynamic model. When an error arises between the target and actual values of the inclinatory angle and the angular velocity owing to a modeling error or disturbance, a restoration force acting to bring the inclination of the actual robot closer to that of the model is produced by deliberately shifting a ground contact portion (foot) or moment of the actual robot away from that of the target walking pattern, thereby shifting the ground reaction force of the actual robot away from that of the target walking pattern calculated from the model. (The term "ground reaction force" is used here to mean the resultant force and moment at a point of action obtained as the vectorial sum of all ground reaction forces acting on the individual legs.)

When this technique is used, however, it sometimes happens, during an one-leg support period of a biped walking robot for example, that even if the ankle joint angle is shifted greatly for deliberately producing a large shift in the ground reaction force of the actual robot, it is nevertheless impossible to produce a desired ground reaction force with the ZMP outside the ground contact surface and, as a result, a part of the foot rises off the ground. Thus, when the actual robot has come to incline greatly with respect to the attitude defined in the model, it is not possible to obtain a righting force strong enough to restore the actual robot's inclination to normal. The robot therefore falls over. In other words, in this system the restoring effect for reducing the error between the target and actual values is limited to within the range in which the ZMP can exist.

This will be explained with reference to the drawings. In controlling the joint displacements of the actual robot to faithfully follow that defined by the model, if the inclinatory angle and inclinatory angular velocity of the actual robot agree with those of the model, the ZMP of the actual robot drawn in solid lines in FIG. 1A and FIG. 1B will coincide with the target ZMP determined from the model and the robot will walk in the desired attitude. If, however, a modeling error or a disturbance causes errors to arise in the robot's inclinatory angle and inclinatory angular velocity as indicated in broken lines in FIG. 1B, the gravitational force produces a tendency toward divergence in which the errors increase more rapidly as they grow in magnitude. If the actual ZMP shifts away from the target ZMP, on the other hand, a moment M equal to the product of the distance x between the actual and target ZMPs and the force F is produced about the target ZMP as shown in FIG. 2. This means that a desired moment can be produced by controlling the joint displacements for deliberately shifting the actual ZMP position away from the target ZMP position. Based on this concept, the earlier proposed technique responded to the error in robot's inclinatory angle or angular velocity by deliberately shifting the actual ZMP position as shown in FIG. 2 so as to produce a moment in the direction of attitude restoration. As is clear from FIG. 2, however, the range within which the actual ZMP position can be shifted is limited to the foot region Xsole.

Therefore, the object of this invention is, more specifically, to provide an attitude stabilization control system for a legged mobile robot which is an effective improvement on the technique recently proposed by the assignee.

SUMMARY OF THE INVENTION

For realizing this, the invention provides an improved model-based attitude stabilization control system for a legged mobile robot having at least one model which the control follows, wherein the improvement comprises that a manipulated variable which is a function of a state error such as that between the inclination of the model and the actual robot is fed back to at least the model for modifying its behavior.

To be specific, the action which works to converge to zero the inclinatory error which the gravitational force works to diverge is produced by the difference between the ground reaction forces of the actual robot and the model. Therefore, it should be possible to obtain an effect equivalent to that produced by shifting the ground reaction force of the actual robot, by instead shifting the ground reaction force of the model to the direction in which the attitude is restored. The present invention uses this effect. As shown in FIG. 3, since it is the ZMP of the model that is shifted, the range within which the shift can be made is no longer restricted to the region Xsole directly under the foot but is extended far beyond the foot ground contact surface. This means that the aforesaid distance x can be increased and that, as a result, the moment can be increased to obtain a large attitude restoring force.

This will be explained further with respect to the simple robot shown in FIG. 4, which has only a foot, a single-link leg and a trunk. The mass of the leg is designated m, the inertial moment of the leg about the ankle I, and the distance between the center of gravity of the leg and the ankle h. The mass and inertial moment of the trunk are both assumed to be O. The height of the ankle from the ground is also assumed to be O (for simplifying the analysis by making the ground reaction force and the ankle moment coincident). The leg's inclinatory angle relative to the vertical (angle of inclination of the line segment connecting the ankle and the center of gravity) is designated θlink, the trunk's inclinatory angle relative to the vertical θtrunk, and the hip joint's bending angle θhip. In the drawing, θlink and θtrunk are negative and θhip positive. The moment acting on the ankle is designated Mact. (Since the height of the ankle from the ground is O, the ground reaction force is also Mact.) Gravitational acceleration is designated g. It is assumed that the ankle is subject to a conventional torque control and that the hip joint's bending angle is displacement controlled.

The geometric relationship will lead Eq. 1.

$$\theta trunk = \theta link + \theta hip \qquad \text{Eq. 1}$$

The equation of motion of the robot's leg will be expressed as Eq. 2.

$$I \cdot \frac{d^2 \theta link}{dt^2} - m g h \cdot \theta link = Mact \qquad \text{Eq. 2}$$

Laplace transformation of Eq. 2 gives Eq. 3.

$$\theta link = \frac{Mact}{IS^2 - m g h} \qquad \text{Eq. 3}$$

Let us now create a mathematical model having exactly the same structure and parameters as the actual robot. Calling the leg's inclinatory angle relative to the vertical (inclination of the line segment connecting the ankle and the center of gravity) θmdllink, the trunk's inclinatory angle relative to the vertical θmdltrunk, the hip joint's bending angle θmdlhip, and the moment acting on the model ankle (i.e. the model's ground reaction force) Mmdl, the geometric and the dynamics of the model will be expressed as Eq. 4 and Eq. 5.

$$\theta mdltrunk = \theta mdllink + \theta mdlhip \qquad \text{Eq. 4}$$

$$I \cdot \frac{d^2 \theta mdllink}{dt^2} - m g h \cdot \theta mdllink = Mmdl \qquad \text{Eq. 5}$$

Now let us generate a target walking pattern (gait) based on the model. The target walking pattern is generally expressed in terms of the initial state of the model, manipulated variables to be applied to the model and constraint conditions. Specifically, it is expressed in terms of the leg's initial inclinatory angle θreflinkO and leg's initial inclinatory angular velocity omega reflinkO, the ankle moment's time function Mref(t), and the trunk's inclinatory angle's time function θreftrunk(t). To simplify the analysis, the trunk's inclinatory angle's time function θreftrunk(t) is assumed to be O at all times.

Now implement a control as follows.

The model trunk's inclinatory angle θmdltrunk is maintained constantly coincident with θreftrunk(t) (since θreftrunk(t) is O, θmdltrunk is O at all times). The model's ankle is subjected to a torque control so as to maintain the sum of Mref(t) and a manipulated variable Mactfb (a function of the trunk's inclinatory angular error to be explained later) coincident with the actual moment Mact. The actual robot's hip joint's bending angle θacthip is subjected to a displacement control using the model's hip joint's bending angle θmdlhip as the target displacement. In other words, θacthip is controlled to coincide with θmdlhip. The trunk is equipped with an inclination sensor for detecting the trunk's inclinatory angle θacttrunk.

The actual robot's trunk's inclinatory angular error relative to the model θerr is calculated using Eq. 6. In the example at hand, since θmdltrunk is maintained constantly O, it follows that the actual robot's trunk's inclinatory angular error θerr is equal to θacttrunk.

$$\theta err = \theta acttrunk - \theta mdltrunk \qquad \text{Eq. 6}$$

The object of the control is to converge the trunk's inclinatory angular error θerr of the actual robot relative to the robot model to zero during walking. In the aforesaid control proposed earlier by the assignee, a manipulated variable Mactfb calculated as a function of the trunk's inclinatory angular error was added to the actual robot's ankle moment Mact to thereby establish a feedback loop. In contrast, in the system according to the present invention, a manipulated variable Mmdlfb calculated as a function of the trunk's inclinatory angular error is added to the model's ankle moment Mmdl to establish a feedback loop.

The effect of the control according to this invention is compared with that according to the earlier proposed technique in the block diagram of FIG. 5 showing from Mactfb and Mmdlfb to the inclinatory angular error θerr. (Note that the figure does not show the feedback from θerr to Mactfb or the feedback from θerr to Mmdlfb.)

Insofar as the control response is adequately high relative to the behavior of θactlink, the transfer functions of the torque control section and the displacement control section can be deemed to be unity. Assuming this to be the case and focusing solely on the relationship among Mactfb, Mmdlfb and θerr, FIG. 5 can be modified as shown in FIG. 6. From FIG. 6 it can be seen that if a rule, hereinafter referred to as "H (S)", for example, is defined as the feedback rule, then feeding back Mactfb calculated according to Eq. 7 to Mact and feeding back Mmdlfb calculated according to Eq. 8 to Mact have the same effect as regards the behavior of θerr.

$$Mactfb = H(S) \cdot \theta err \qquad \text{Eq. 7}$$

$$Mmdlfb = -H(S) \cdot \theta err \qquad \text{Eq. 8}$$

The behavior of θerr is also determined by the difference between Mactfb and Mmdlfb. Thus, If H (S) is distributed to Mactfb and Mmdlfb as shown in Eq. 9, this also has the same effect.

$$Mactfb - Mmdlfb = H(S) \cdot \theta err \qquad \text{Eq. 9}$$

The foregoing is the basic principle of the invention. Insofar as a model which faithfully simulates the dynamics of the actual robot is created and the difference between the ground reaction force of the actual robot and that of the robot model is controlled, the same principle can be applied with the same effect irrespective of the complexity of the actual robot. As will be explained later, even when the dynamic model is expressed in terms of the perturbation from the target walking pattern the same effect as that proposed in the earlier technique will be obtained insofar as the error θerr and its differential omega err are small.

Since, differently from the earlier proposed control, the configuration according to this invention does not require the ZMP of the actual robot to be deliberately shifted from its proper position, even if an external disturbance produces a vary large error in the inclinatory angle and angular velocity, it achieves an attitude restoration of a large magnitude not obtainable by the earlier proposed control and thus enables the error to be converged on zero in a short period of time, without loss of ground contactability (rising of the sole of the foot off the ground). Moreover, since there is no interference between the model and the ground (other than that deliberately produced for shifting the overall ground reaction force of the actual robot), the actual robot, which follows the model, does not experience any interference with the ground either. The footfall impact can therefore be controlled to a low level.

For ensuring that the foot does not rise off the ground in the foregoing control, it is necessary to control Mact (Mref+ Mactfb in the foregoing example) to within a certain range (in level-ground walking, for example, to control it such that the actual robot's ZMP does not move beyond the foot contact surface). Thus Mactfb and Mmdlfb should be determined such that the value of Mact does not exceed the limit placed thereon and, also, so as to satisfy Eq. 10.

$$Mactfb - Mmdlfb = H(S) \cdot \theta err \qquad \text{Eq. 10}$$

It should further be noted that, since the open loop's transfer function between Mactfb and θmdllink and the open loop's transfer function between Mmdlfb and θmdllink are not the same, the control according to the earlier proposed technique and the control according to this invention exhibit different characteristics as regards the behavior of θmdllink.

BRIEF DESCRIPTION OF THE DRAWINGS

The above and other objects and advantages of the invention will be more apparent from the following description and drawings, in which:

FIG. 24 is a flow chart showing a subroutine of attitude control procedures of FIG. 23;

DETAILED DESCRIPTION OF THE PREFERRED EMBODIMENTS

Embodiments of the invention will now be explained taking a biped robot as an example of a legged mobile robot.

Figure 1A:
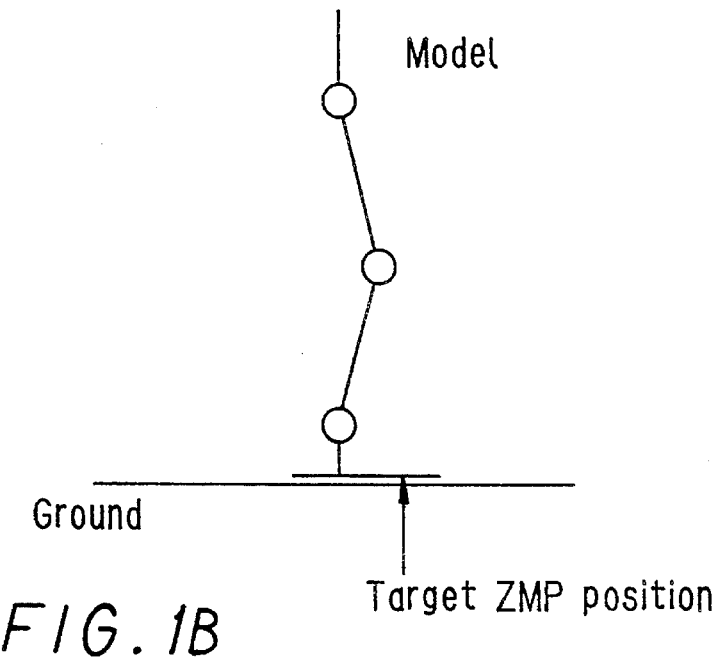
FIGS. 1A and 1B are views explaining the control proposed earlier by the assignee of the invention using a concept of ZMP (zero moment point; the center of gravity at which only the vertical ground reaction force acts) in which a mathematical robot model is established to define a target position of the ZMP and an actual robot is controlled such that its actual ZMP coincides with the target position.
Figure 1B:
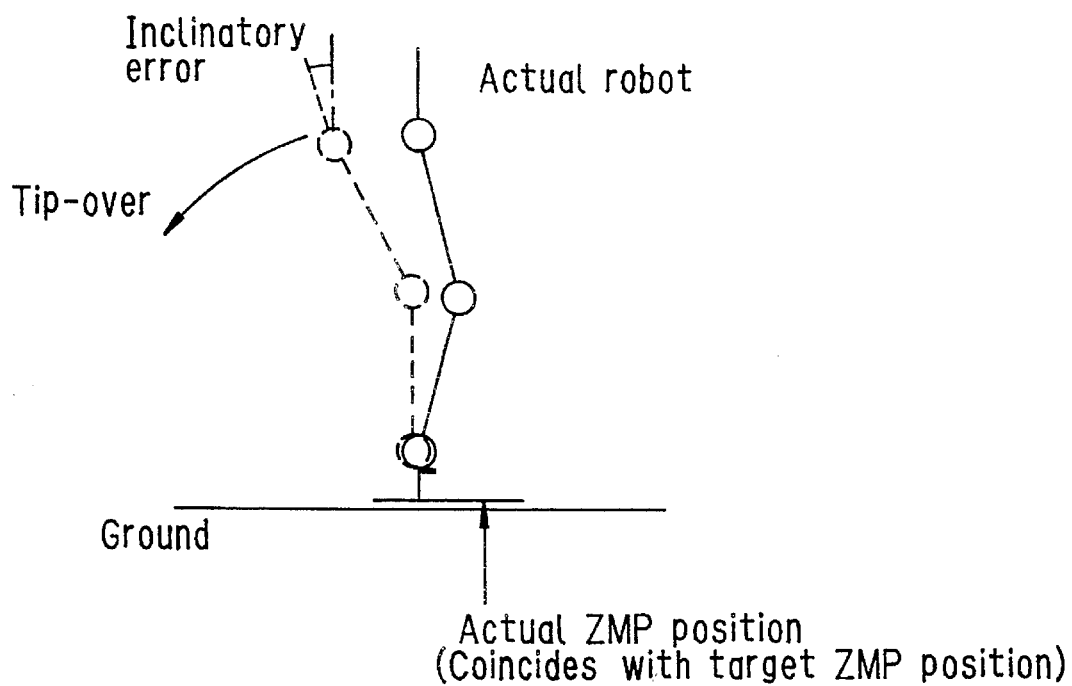
Figure 2:
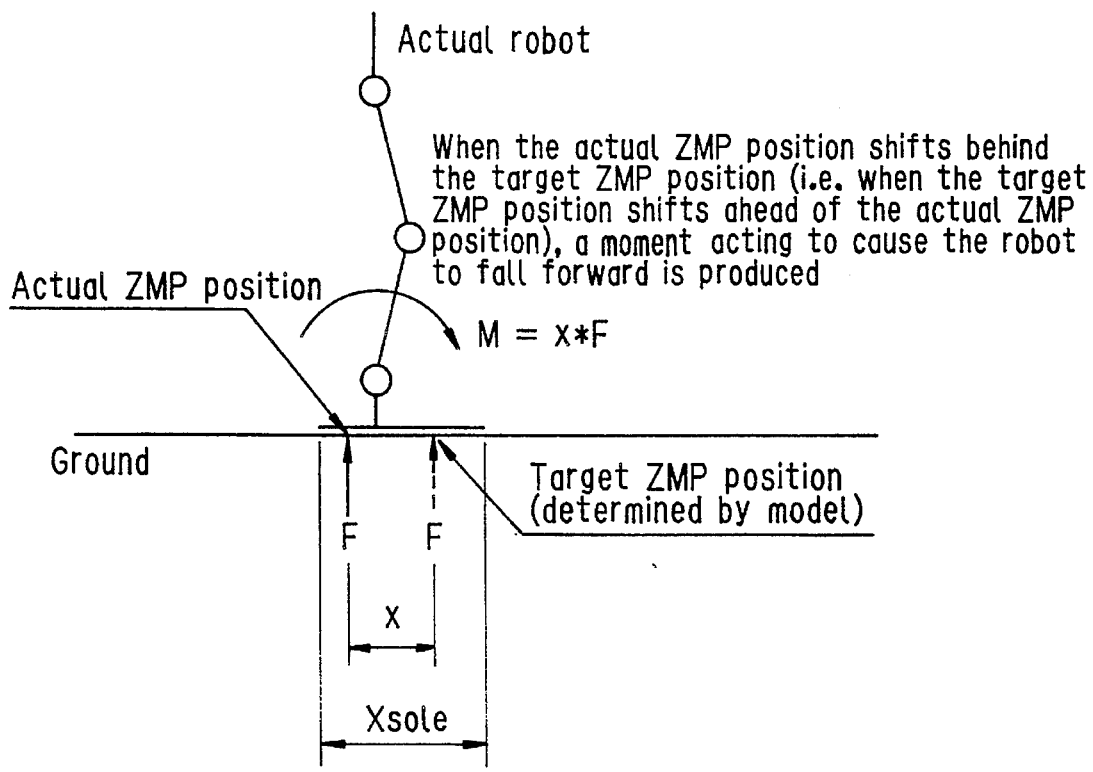
FIG. 2 is a view showing a moment resulting when the actual ZMP shifts from the target ZMP position which can be used to restore robot's attitude, if destabilized, by deliberately producing it.
Figure 3:
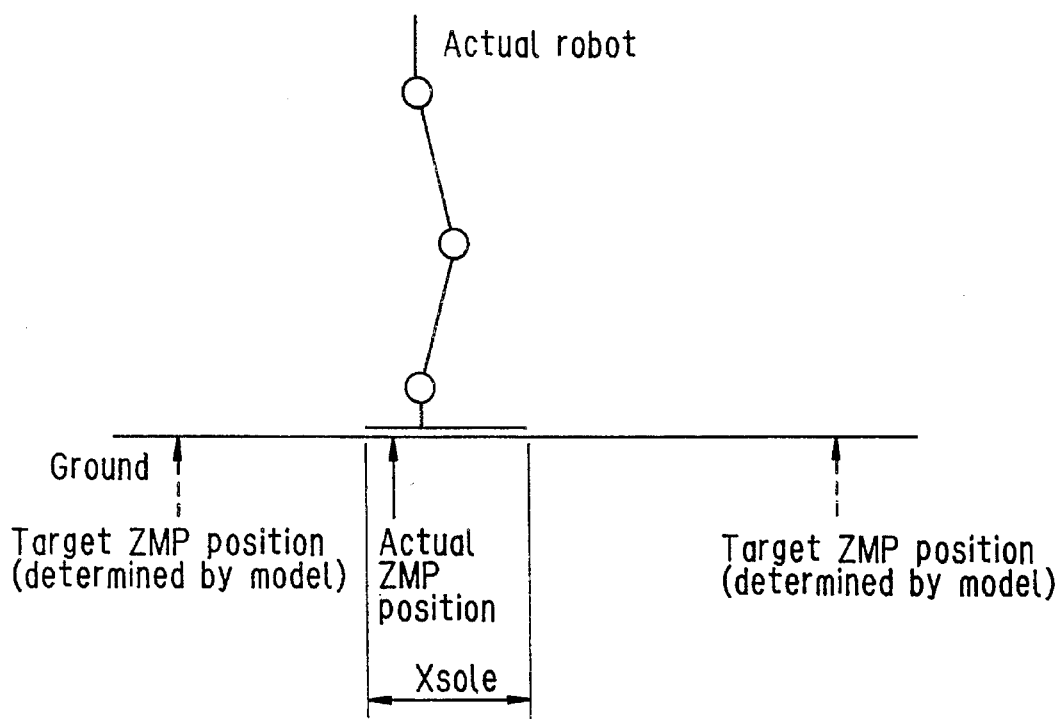
FIG. 3 is a view, similar to FIG. 2, but showing the basic principle of the invention.
Figure 4:
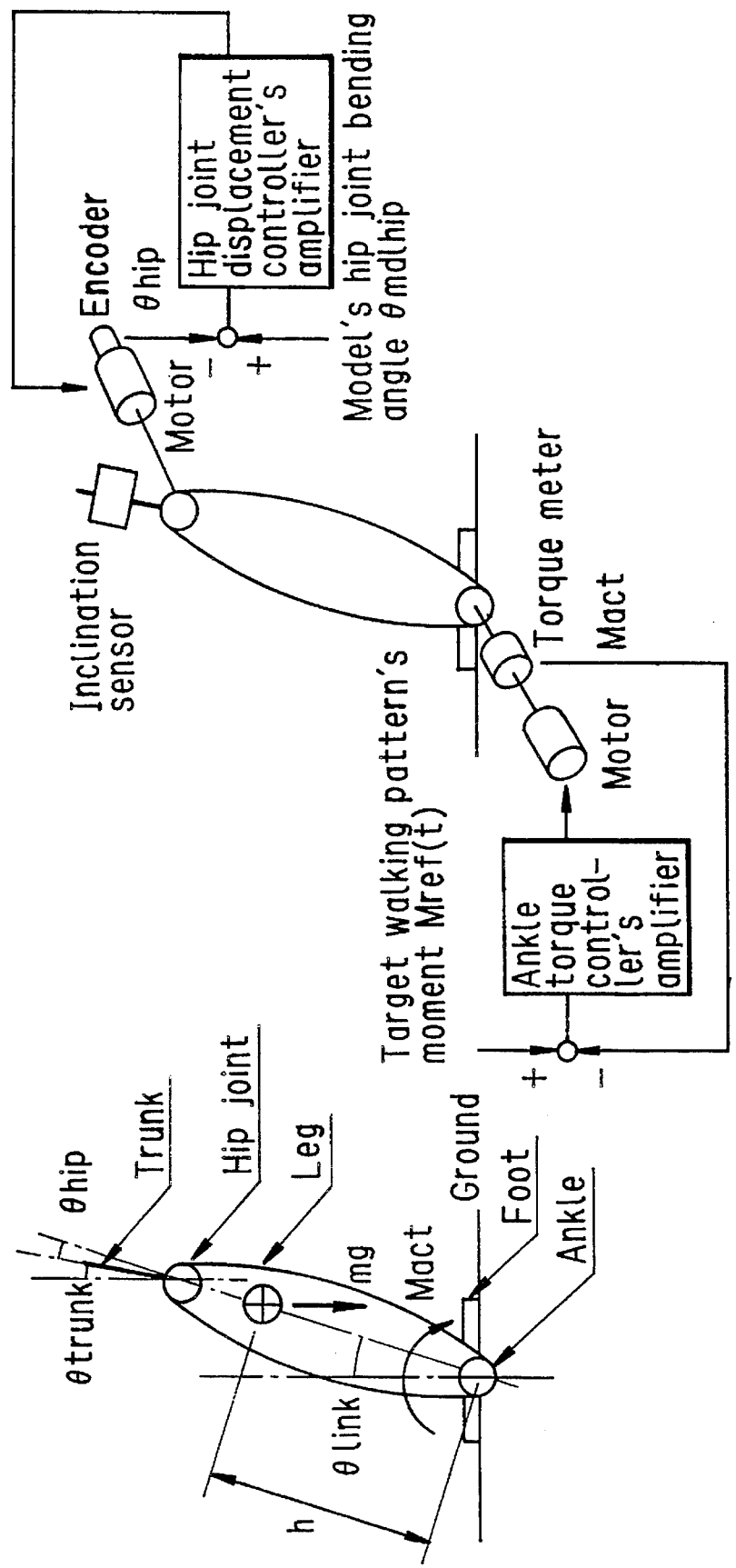
FIG. 4 is a block diagram explaining a control based on the basic principle of the invention taking a simple robot structure as an example.
Figure 5:
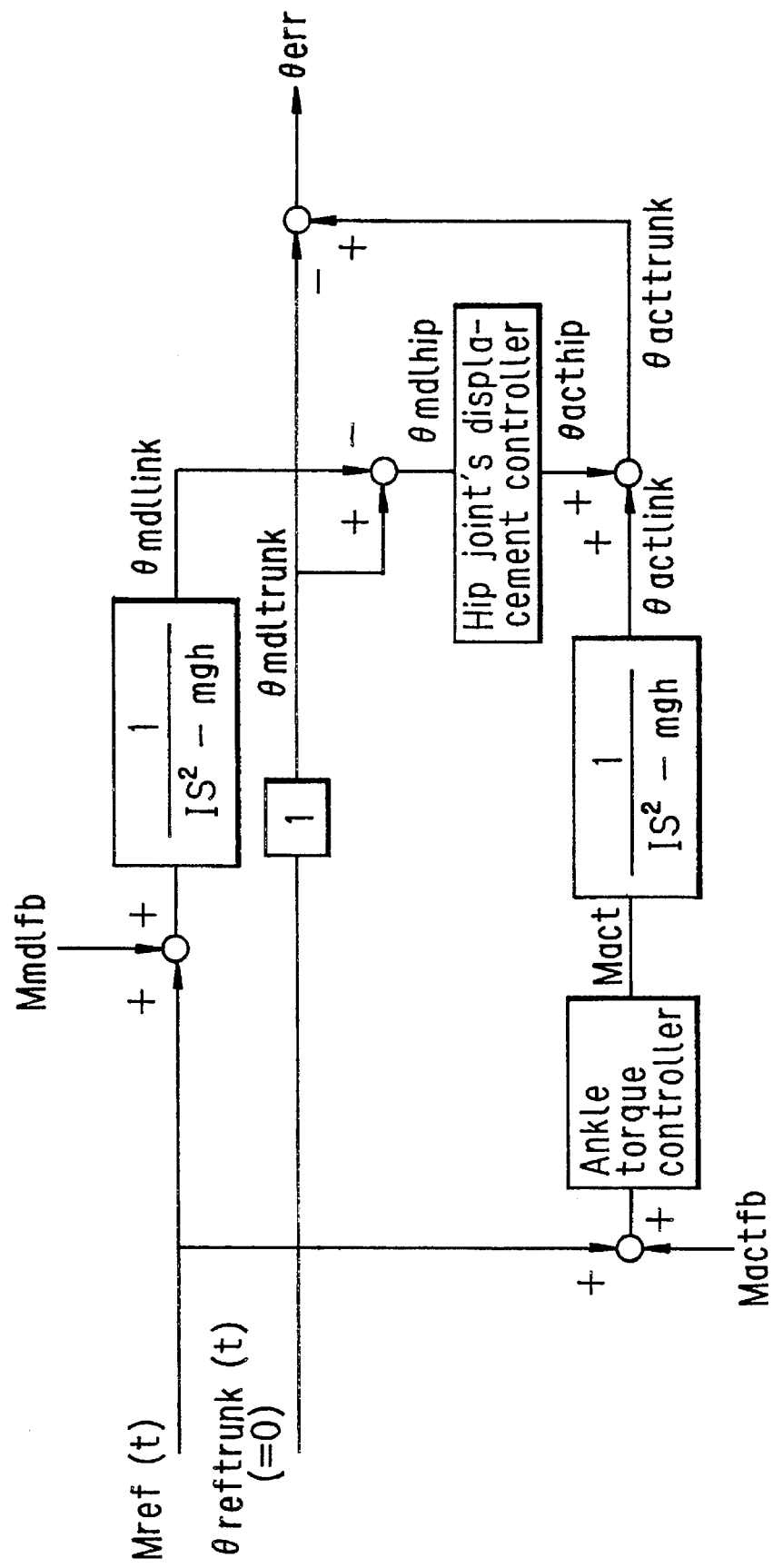
FIG. 5 is a block diagram explaining the control of FIG. 4 in more detail.
Figure 6:
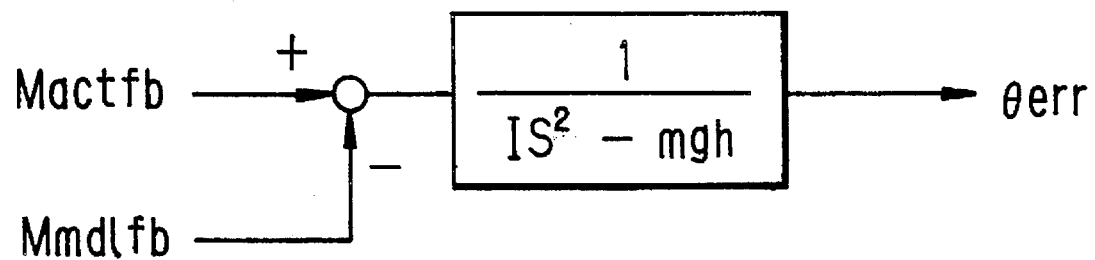
FIG. 6 is a block diagram rewritten from that of FIG. 5 in a simple form.
Figure 7:
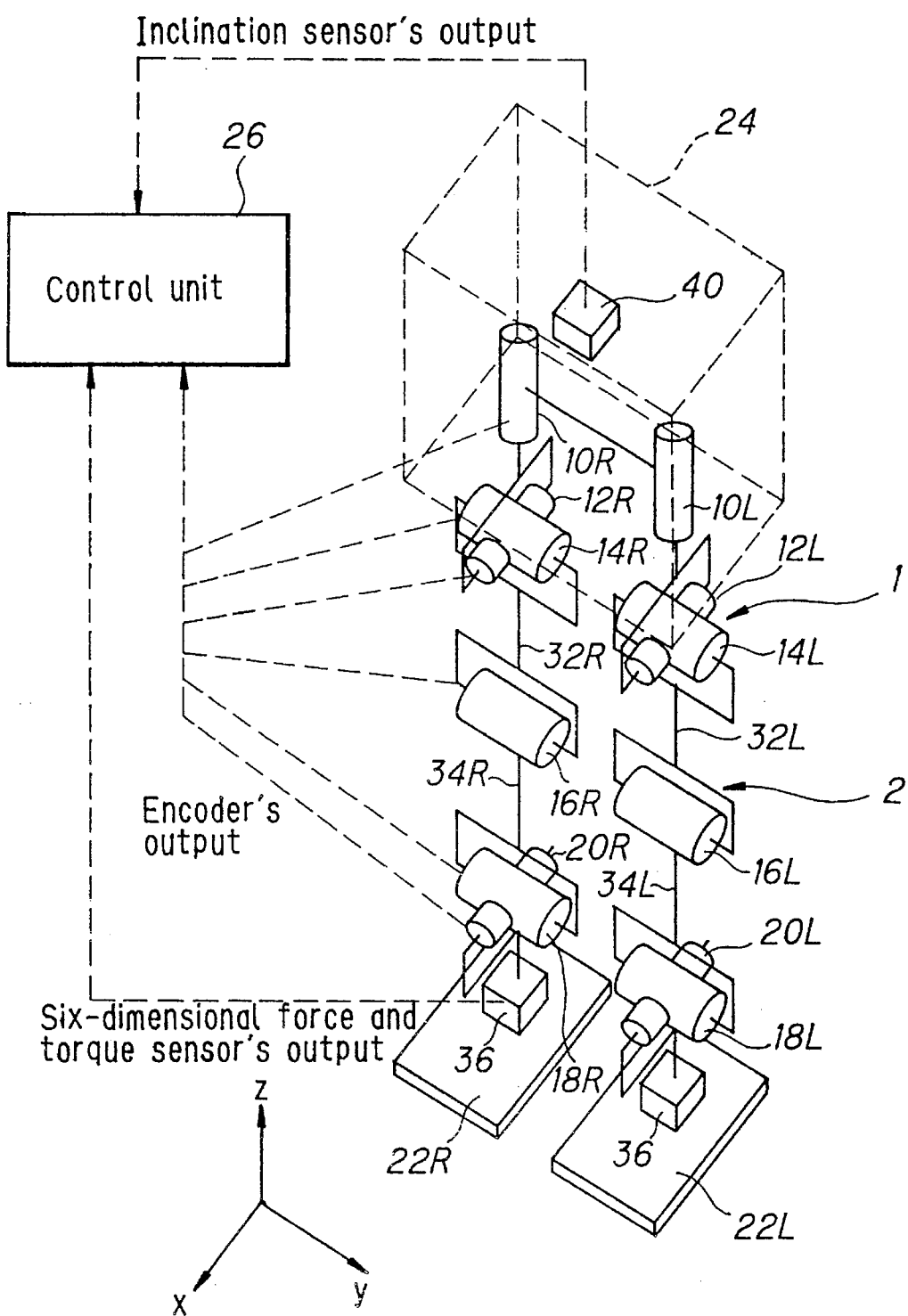
FIG. 7 is an overall skeleton view of an attitude stabilization control system for a legged mobile robot according to the invention.

FIG. 7 is an overall skeleton view of an attitude stabilization control system for legged mobile robot according to the invention. In the figure, a robot 1 has left and right legs 2 each having six joints (axes). (To make the arrangement easier to understand, the joints (axes) are represented as the electric motors by which they are driven.) The six joints (axes) are, starting at the top, joints (axes) 10R, 10L for swiveling (generally horizontal rotation) of the legs at the hip (R and L indicating the right and left legs), joints (axes) 12R, 12L for rotation at the hip in the pitch direction (rotation about the x axis), joints (axes) 14R, 14L for rotation at the hip in the roll direction (rotation about the y axis), joints (axes) 16R, 16L for rotation at the knee in the roll direction, joints (axes) 18R, 18L for rotation at the ankle in the roll direction and joints (axes) 20R, 20L for rotation at the ankle in the pitch direction. Feet 22R, 22L are provided at the lower end of this arrangement and a trunk (body) 24 is provided at the upper end, which houses electronic components such as a control unit 26 made up of a microcomputer.

The hip joints in the foregoing configuration are constituted by the joints (axes) 10R(L), 12R(L) and 14R(L) and the ankle joints by the joints (axes) 18R(L) and 20R(L). The hip and knee joints are connected by thigh links 32R, 32L and the knee joints and ankle joints by crus links 34R, 34L. The legs 2 thus have six degrees of freedom, so that during locomotion the legs as a whole can be caused to execute the desired motion by driving the 6×2= 12 joints (axes) to appropriate angle. The robot is thus capable of walking freely within three dimensional space. The joints are provided mainly with electric motors, as was mentioned earlier, and reduction gear mechanism for increasing motor torque. The structure of the joints is described in the assignee's earlier Japanese Patent Application No. 1(1989)-324,218 (Japanese Laid-Open Patent Publication No. 3(1991)-184, 782) etc., and since it is not essential aspect of the present invention, will not be explained further here.

The individual ankles of the robot 1 shown in FIG. 7 are provided with a six dimensional force and torque sensor 36 of conventional design. By measuring the x, y and z force components Fx, Fy and Fz transmitted to the robot through the feet and also measuring the moment components Mx, My and Mz around the three axes, the six-dimensional force and torque sensor 36 detects whether or not the associated foot has landed and the magnitude and direction of the forces acting on the supporting leg. The sole of each foot is equipped at its four corners with touchdown switches 38, not illustrated in FIG. 7, of conventional design for detecting whether or not the foot is in contact with the ground. The top of the trunk 24 is provided with an inclination sensor 40 for detecting the robot's inclinatory angle and angular velocity relative to z axis in the x–z and y–z planes. Each electric motor at the individual joints is provided with a rotary encoder for generating rotational information. And, although not illustrated in FIG. 7, the robot 1 is provided with a zero reference switch 42 for calibrating the output of the inclination sensor 40 and a limit switch 44 for a fail safe. The outputs of the sensors 36 and the like are sent to the control unit 26 in the trunk 24.

Figure 8:
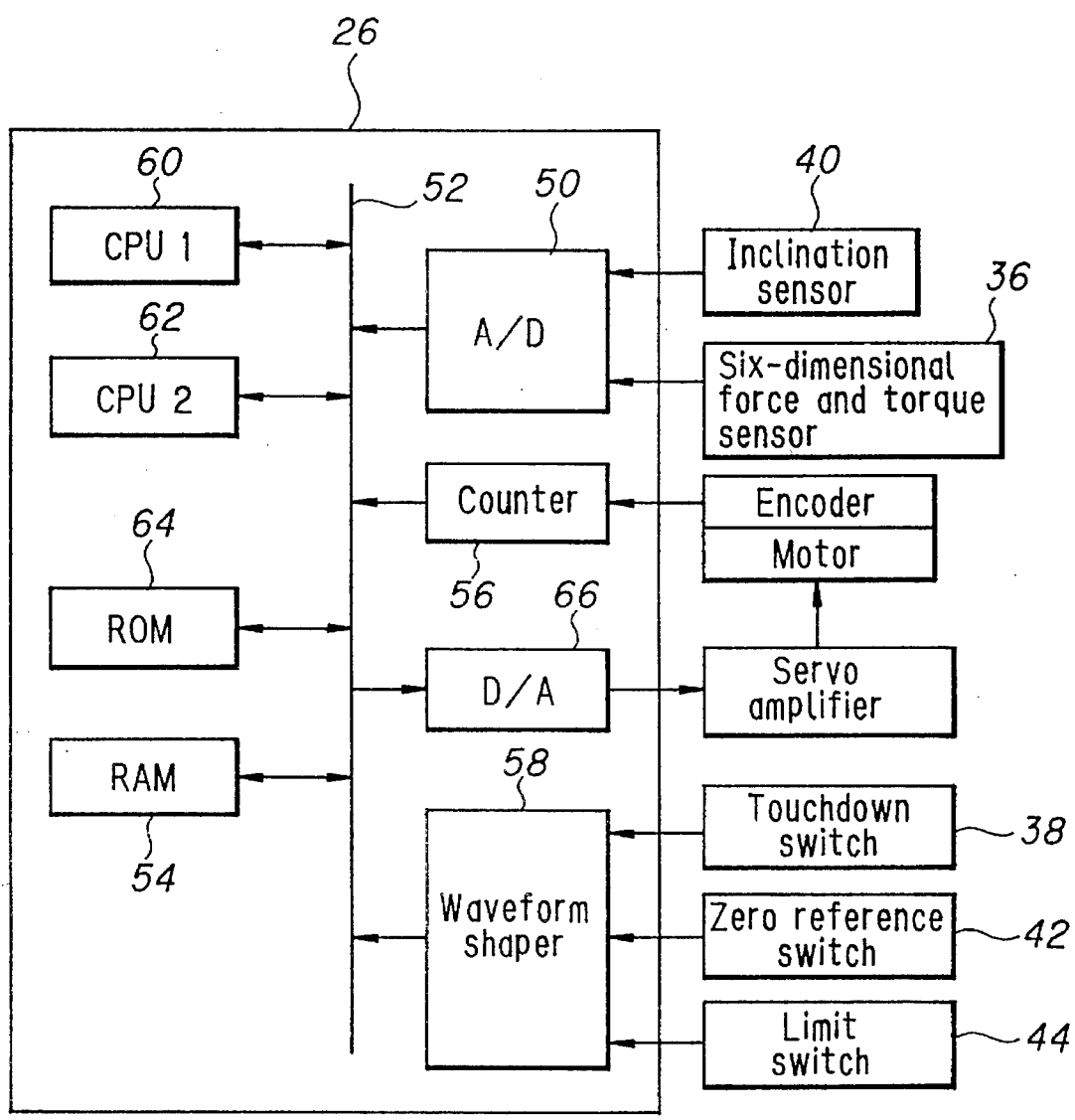
FIG. 8 is a block diagram showing a detailed structure of a control unit illustrated in FIG. 7.

As shown in the block diagram of FIG. 8, the control unit 26 has a microcomputer. The outputs from the inclination sensor 40 etc. are converted into digital signals by an A/D converter 50 and the resulting digital values are sent via a bus 52 to a RAM (random access memory) 54 for storage. In addition, the outputs of encoders disposed adjacent to the respective motors are input to the RAM 54 through a counter 56, while outputs of the touchdown switches 38 and the like are stored in the RAM 54 via a waveform shaper 58. The control unit has a first processor 60, a second processor 62 and a ROM 64. The first processor 60 computes target joint angles on the basis of a walking pattern (gait) and outputs the same to the RAM 54. The second processor 62 fetches the target joints angles and measured joint angles from the RAM 54, computes control commands of the individual joint motors and sends the same to associated servo amplifiers thereof via a D/A converter 66.

The operation of the control system will now be explained in detail.

Figure 9:
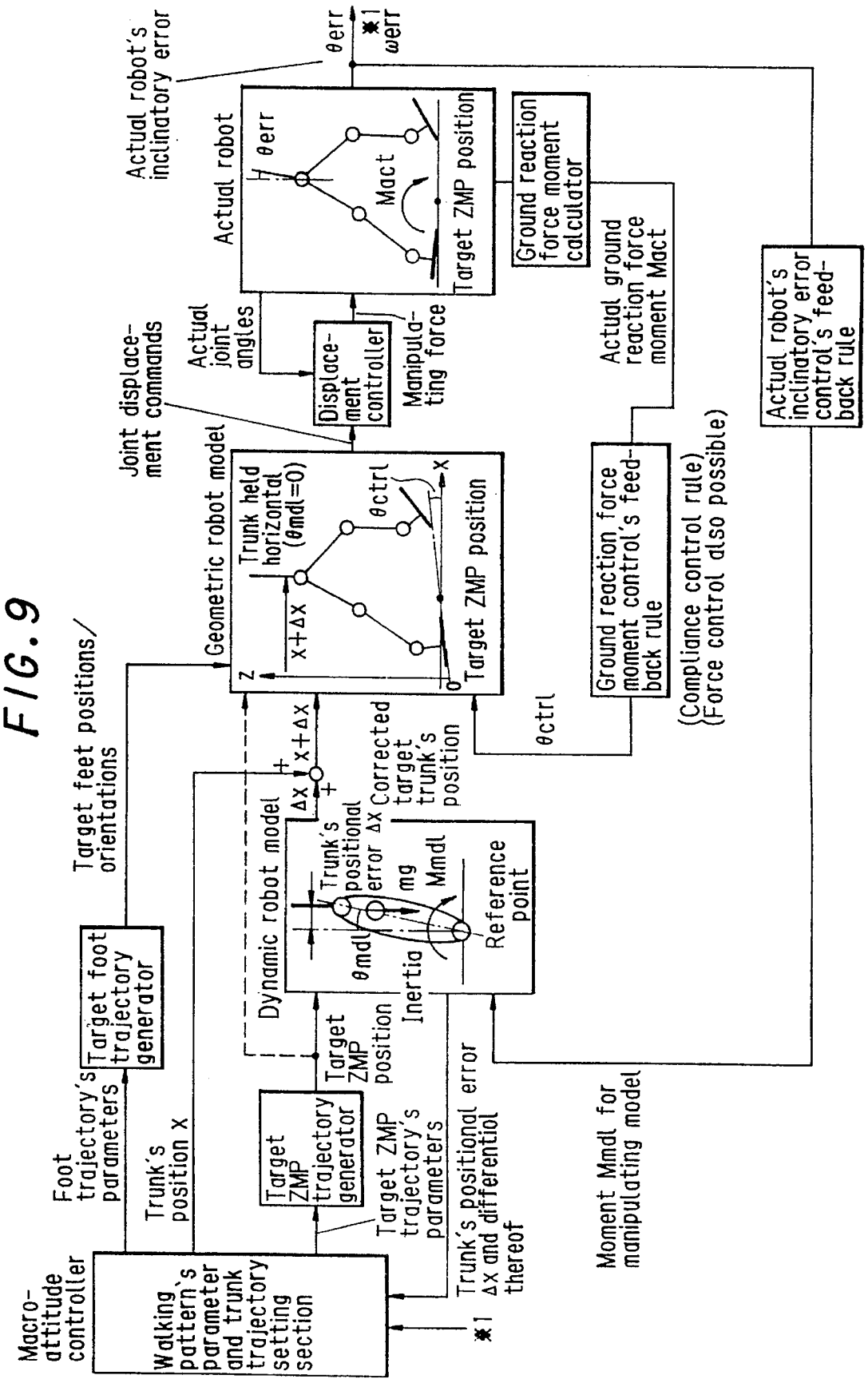
FIG. 9 is a block diagram showing the control according to a first embodiment of the invention.
Figure 10:
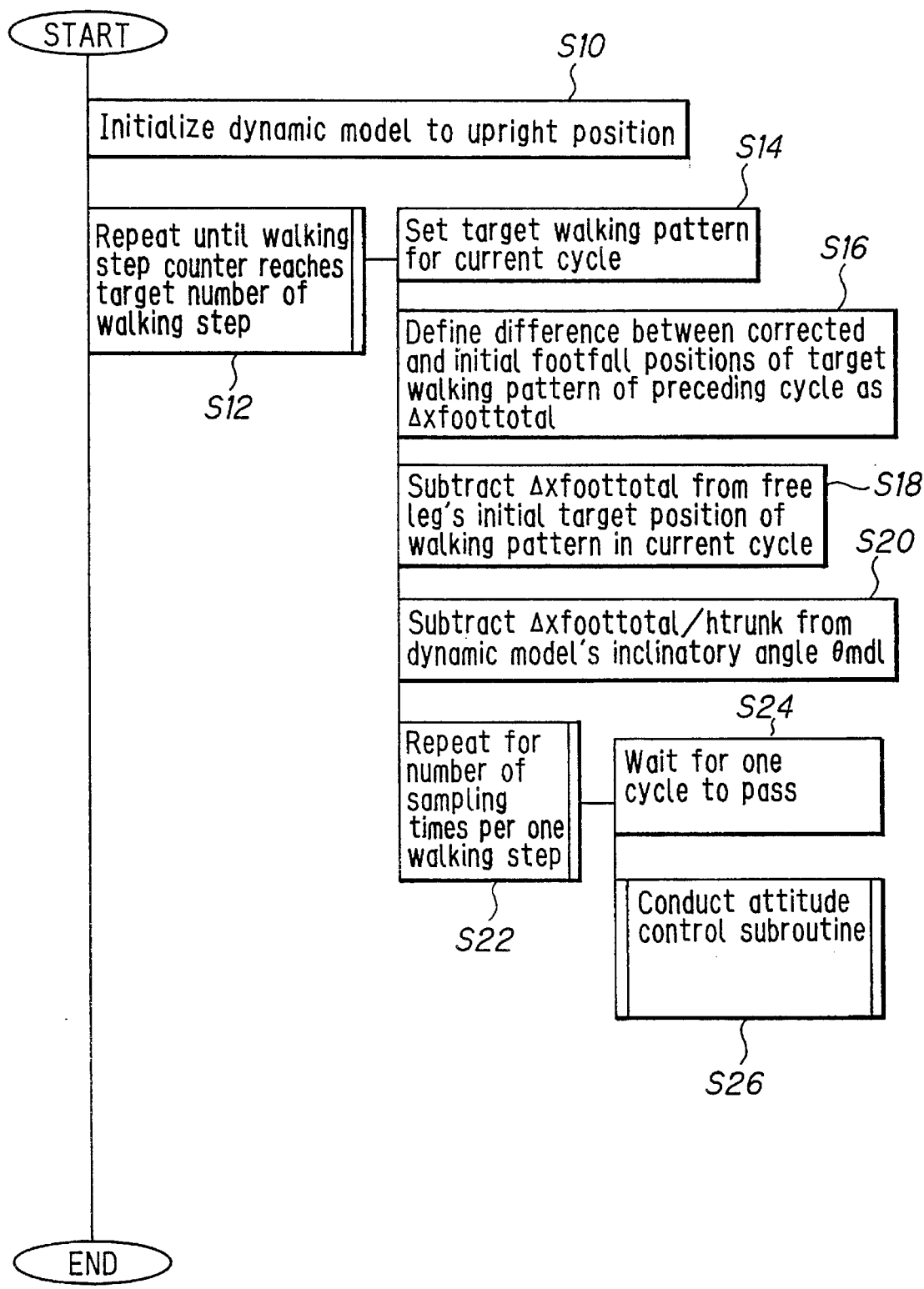
FIG. 10 is a flow chart showing a main routine of the control of FIG. 9.
Figure 11:
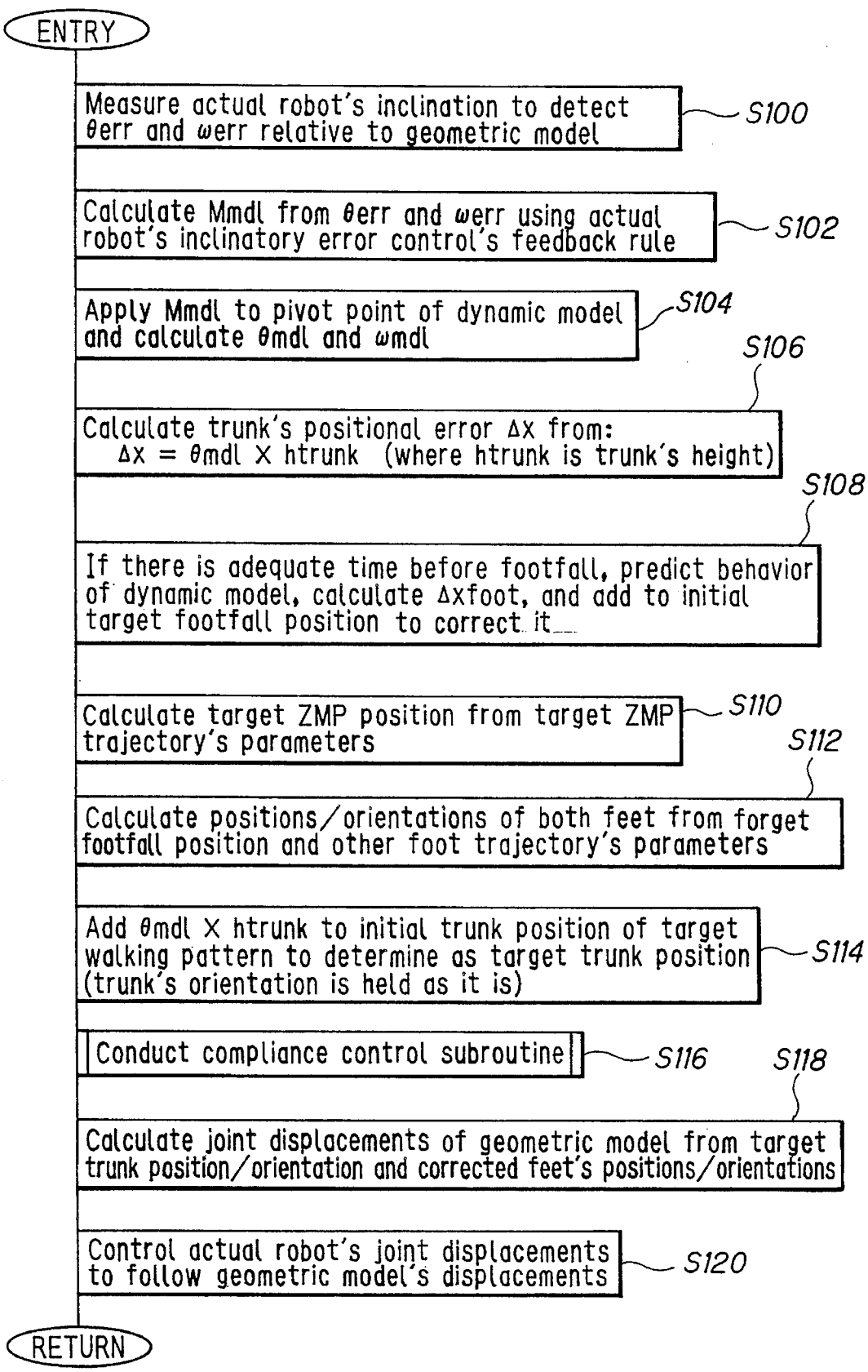
FIG. 11 is a flow chart showing a subroutine of attitude control procedures of FIG. 10.
Figure 12:
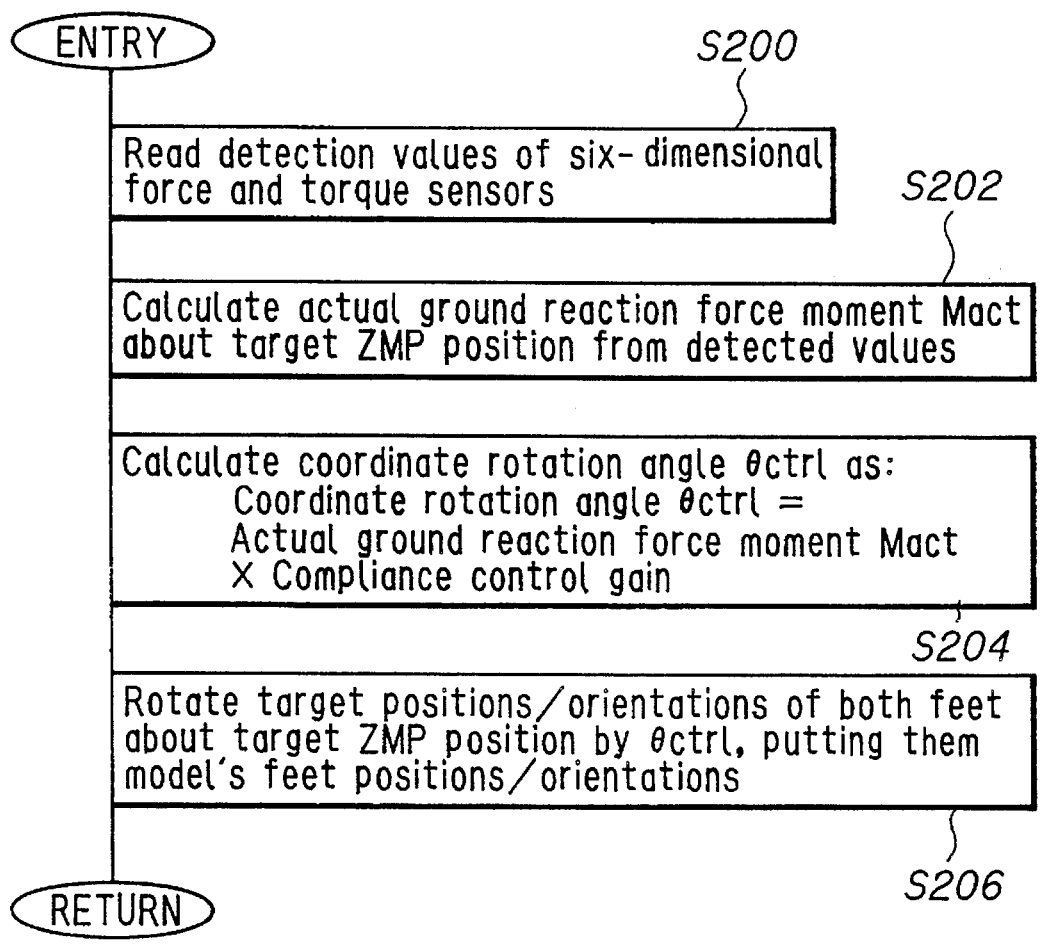
FIG. 12 is a flow chart showing a subroutine of compliance control procedures of FIG. 11.

FIG. 9 is a block diagram showing the operation of the control system according to a first embodiment of the invention and FIGS. 10 to 12 are flow charts showing the same. Before going into a detailed explanation of the control with reference to FIGS. 10 to 12, the control will first be explained generally with reference to FIG. 9. While the following explanation will be made only in respect of the x direction (direction of robot advance), the same also applies to the y direction (lateral direction thereto).

As shown in FIG. 9, in the present embodiment a rigid model is used as the geometric model of the robot, while as the dynamic model there is used one which simulates the behavior of the trunk's positional perturbation (variation) component relative to a target walking pattern as an inverted pendulum. Similarly to those mentioned earlier, the mass of the inverted pendulum is defined as m, the inertial moment about the pivot point as I and the distance between the pivot point and the center of gravity as h. The target walking pattern is expressed in terms of the position/orientation of the trunk 24 and the positions/orientations of the feet 22R (L). As regards the positions/orientations of the feet 22R (L), for each walking step, foot trajectory's parameters (e.g., the free leg's footfall position, footfall time etc.) are supplied from a macro-attitude controller to a target foot trajectory generator which generates the instant-by-instant positions and orientations of the individual feet in real time. If the robot's attitude should destabilize in the course of this control, the attitude of the model is first similarly destabilized and then restored toward stabilization. The actual robot is simultaneously controlled in line with the model so as to restore its attitude stability. Thus, the attitude restoration is not conducted instant by instant but is achieved smoothly over a relative long period as the final result. The term "macro-attitude" is used here to indicate this characteristic of the control.

On the other hand, target ZMP trajectory's parameters for each walking step (in the case where they are expressed by broken-line curves, for example, the coordinates and times of the broken-line curve joints) are supplied from the macro-attitude controller to a target ZMP trajectory generator which calculates the target position of the ZMP at each instant in real time. And the position/orientation of the trunk 24 is controlled by storing time series data generated in advance offline in the macro-attitude controller so as to satisfy the target ZMP trajectory and causing the data to be output during walking. (The foot trajectory's parameters, target ZMP trajectory's parameters and other parameters expressing the characteristics of the walking pattern will be referred to generally as the "walking pattern's parameters" in the following.)

Next, the inclinatory angular error θerr and the angular velocity error omega err of the actual robot relative to the geometric model are detected. Here, if it can be assumed that the joint displacement of the actual robot 1 follows those of the geometric model faithfully, the inclinatory angle and angular velocity of the trunk 24 can be used to represent the attitude's inclinatory angle and angular velocity. It is also possible to use a positional error of the center of gravity.

These are defined as the state quantities and the manipulated variable Mmdl for converging them on zero (state feedback amount) obtained from an actual robot's inclinatory error control's feedback rule is determined in terms of moment and applied to the pivot point of the inverted pendulum type dynamic model. The manipulated variable is, hereinafter, called the moment Mmdl for manipulating model. The moment Mmdl can be said to correspond to the ground reaction force moment acted on the dynamic model. The inverted pendulum type dynamic model moves under the influence of Mmdl and the gravitational force acting on its center of gravity. The state quantities of the dynamic model, namely the behaviors of the inclinatory angle θmdl and the its angular velocity omega mdl (omitted from illustration), are calculated successively based on the past states and the moment Mmdl applied to the pivot point.

The positional error delta x of the trunk 24 in the x direction is calculated using Equation 11.

$$\Delta x = \theta mdl \cdot htrunk \qquad \text{Eq. 11}$$

where htrunk is the height of the trunk 24 (more precisely the height of the hip joint above the ground).

The geometric model's trunk position is designated as the position obtained by adding delta x to an initial trunk position x of the walking pattern's parameter.

In addition, the compliance control employed in the earlier proposed technique is used to correct the target walking pattern's feet positions/orientations in accordance with the actual ground reaction force moment Mact around the target ZMP position, and the corrected position and orientation are applied to the geometric model. In the control shown in FIG. 9, a virtual ground's inclinatory angular command θctrl is calculated from Mact using a ground reaction force moment control's feedback rule and the model's feet positions are rotated from that generated by the target foot trajectory generator about the target ZMP position by the amount of the virtual ground's inclinatory angular command θctrl. (Here, the virtual ground's inclinatory angular command θctrl is an angle as if the ground were inclined by the angle such that the robot legs (feet) are rotated by the amount to produce the aforesaid moment for the attitude restoration.) As a result, the inclinatory behavior of the actual robot 1 is simulated by an inverted pendulum which produces a ground reaction force moment proportional to the virtual ground's inclination about a reference point (e.g., the target ZMP position).

The displacements of the individual joints of the geometric model are obtained by inverse kinematic calculation from the trunk's position/orientation calculated and corrected in the foregoing manner. Since the movable portions of the robot have only rotational freedom, all joint displacements are expressed in angles. The robot 1 is equipped with the aforesaid servo control system for causing its joint displacements to follow the joint displacements of the geometric model.

In the foregoing system, the moment Mmdl for manipulating model which is a function of the state quantities θerr and omega err is fed back to the dynamic model and this feedback control acts to converge θerr and omega err on zero in accordance with the basic principle explained earlier. In other words, it acts to bring the actual robot and the model into coincidence in the inclination.

In FIG. 9, once the application of the moment Mmdl for manipulating model to the dynamic model causes its inclinatory angle θmdl and angular velocity omega mdl to shift away from the neutral point (upright state), the dynamic model becomes instable and hence θmdl and omega mdl diverge as a result. The divergence of θmdl and omega mdl (omitted from illustration) is therefore controlled by varying the next free leg's footfall position or footfall time in accordance with the state quantities θmdl and omega mdl.

Here, if the footfall position is changed during a given walking step of the target walking pattern (referred to as the "first walking pattern" hereinafter), only the supporting leg's position will, during the first part of the next walking step (also referred to as the "second walking pattern"), be shifted away from the position of the target walking pattern. From the viewpoint of reference coordinates of the second walking pattern, this corresponds to the supporting leg's foot position being maintained that of the target walking pattern, with only the positions of the free foot and the trunk being shifted by the amount of the variation. Unless some countermeasure is taken, the boundary between the first and second walking patterns will thus become discontinuous. For ensuring the continuity of the geometric model's walking pattern, therefore, the following operation is conducted at the boundary between the walking patterns.

Since the free leg's trajectory is defined by the foot trajectory's parameters such as the initial position and the next footfall position, the free leg's initial position which is one foot trajectory's parameter of the second walking pattern is shifted by the amount of minus delta xfoottotal. The trunk trajectory of the second walking pattern is maintained as it is but the inclinatory angle θmdl of the dynamic model is shifted by minus delta xfoottotal/htrunk. As a result, it becomes possible to manipulate the inclinatory angle θmdl, which is one of the state quantities of the dynamic model, by the amount of minus xfoottotal/htrunk, while maintaining the continuity of the geometric model's walking pattern. In other words, it becomes possible to control the state quantity of the dynamic model by changing the footfall position.

Based on the foregoing, an explanation will now be made with reference to the flow chart of FIG. 10 regarding the model's inclination control algorithm for the case where the footfall position is changed in the direction of robot advance.

First, in step S10, the dynamic model is initialized to a stable upright position. Control then passes to step S12 in which steps S14 to S26 are repeated until a count of the walking step counter reaches a target number of walking steps defined by the target walking pattern. The following terms are defined to have the following meanings:

1. "Walking pattern of one walking step" is defined as the period between the beginning of a two-leg support period and the next free leg's footfall.
2. "The supporting leg in a certain walking pattern" is defined as the leg which provides support during the one-leg support period of the walking pattern, and "the free leg" is defined as the leg which is free during the one-leg support period.
3. "The reference coordinates of the walking pattern" are defined as those of the ground contact point of the foot of the supporting leg during the walking step concerned.

The walking pattern's parameters for the current cycle are set in step S14, whereafter control passes to step S16 in which the difference between the corrected footfall position and the initial footfall position of the target walking pattern in the preceding cycle is defined as delta xfoottotal. Control then passes to step S18 in which delta xfoottotal is subtracted from the free leg's initial target position of the walking pattern in the current cycle and to step S20 in which delta xfoottotal/htrunk is subtracted from the inclinatory angle θmdl of the dynamic model.

In the following step S22, steps S24 and S26 are repeated by the number of sampling times for one walking step. More specifically, after the elapse of one cycle has been ascertained in step S24, control passes to step S26 in which an attitude control subroutine is executed.

The subroutine is shown in FIG. 11. First, in step S100, the inclination of the actual robot is measured and, as explained above, the actual robot's inclinatory angular error θerr and the angular velocity error omega err relative to the geometric model are determined. Control then passes to step S102 in which the aforesaid moment Mmdl for manipulating model about the target ZMP position is calculated from the determined values using an actual robot's inclinatory error control's feedback rule and to step S104 in which Mmdl is added to the pivot point of the dynamic model and its inclinatory angle θmdl and angular velocity omega mdl in the current cycle are calculated. Control then passes to step S106 in which, for the reason explained earlier, the trunk's positional error delta x is calculated in the manner shown, to step S108 in which, provided there is time before the next footfall, the behavior of the dynamic model is predicted and a target footfall's positional correction amount delta xfoot is calculated and added to the initial target footfall position of the target walking pattern to correct the same.

Expanding on the explanation given regarding this earlier, the amount of change in the footfall position should be determined so that the inclinatory angle θmdl and the inclinatory angular velocity omega mdl of the dynamic model and the inclinatory angular error θerr and the inclinatory angular velocity error omega mdl of the actual robot relative to the geometric model will, to the utmost possible, be converged on zero within the next walking step. For this it is necessary to predict from θmdl, omega mdl, θerr, omega err and other current state parameters what behavior the change in footfall position will induce in these θmdl, omega mdl, θerr, omega err during the next walking step.

The basic principle of this invention works to converge θerr and omega err on zero. Thus, θerr and omega err can be ignored without causing any particular problem aside from a slight degradation of prediction precision. This means that no adverse effects arise from determining the amount of change in the footfall position on the basis of a prediction calculation based solely on the current state of θmdl and omega mdl. It is also possible to map the relationship between the current state and the amount of change in the footfall position in advance in the ROM 64 by simulation and then use the mapped values to determine the amount of change in footfall position during actual walking.

One generally known method of determining the amount of change in footfall position from only the current states of θmdl and omega mdl is to determine the amount of change so that the predicted value of the total energy of the dynamic model at the instant of footfall coincides with the total energy at the time of its upright standing. This method, which is commonly used with biped stilt robots and the like, is explained below.

For the total energy at the instant of footfall to coincide with the total energy at the time of upright standing, it is necessary to determine the footfall position so that the predicted values of θmdl and omega mdl immediately after footfall satisfy Eq. 12.

$$\frac{1}{2} \cdot I \cdot \omega mdl^2 = m \, g \, h \cdot \sin(\theta mdl) \cdot \tan(\theta mdl) \qquad \text{Eq. 12}$$

Since θmdl and omega mdl have to be of opposite polarity in order to approach upright standing, it is necessary to satisfy Eq. 13.

$$\theta mdl \cdot \omega mdl \leq 0 \qquad \text{Eq. 13}$$

In view of Eqs. 12 and 13, Eq. 14 will be obtained.

$$\omega mdl = -\sqrt{\frac{2 m g h}{I} \cdot \sin(\theta mdl) \cdot \tan(\theta mdl)} \qquad \text{Eq. 14}$$

Eq. 14 can be approximated as Eq. 15.

$$\omega mdl = -\sqrt{\frac{2 m g h}{I}} \cdot \theta mdl \qquad \text{Eq. 15}$$

In other words, it suffices to determine the footfall's positional correction amount delta xfoot such that the ratio between omega mdl and θmdl immediately after upright standing becomes that defined by Eq. 15. The predicted values of omega mdl and θmdl immediately following footfall in the case where the footfall position is not corrected can be obtained by kinematic calculation from the current omega mdl, θmdl, θerr and omega err of the dynamic model, and are designated "omega mdle" and "θmdle". (In particular, if θerr and omega err are so small in comparison with omega mdl and θmdl as to be negligible, they can easily be calculated analytically.) Then if θmdle can be corrected to omega mdle/square root of (2 mgh/I), Eq. 15 will be satisfied. Since, as was explained earlier, θmdl can be manipulated by the amount of minus delta xfoot/htrunk by correcting the footfall position by the amount of delta xfoot, this can be achieved by determining the footfall's positional correction amount delta xfoot in accordance with Eq. 16.

$$\Delta xfoot = -\frac{\theta mdle + \omega mdle}{\sqrt{2 m g h/I}} \cdot htrunk \qquad \text{Eq. 16}$$

Thus the footfall's positional correction amount delta xfoot is determined and the target footfall position xfoot is corrected in the course of the walking pattern. This correction is conducted independently for each walking step in the case where the change in the target footfall position greatly complicates the foot trajectory generation. However, when the foot trajectory is generated using another technique onto a function generator, as described in U.S. patent application Ser. No. 08/065,485, the change in the target footfall position can be conducted every sampling cycle. This is because in accordance with the proposed function generator even if the target footfall position is changed every sampling cycle, the foot trajectory is again smoothly corrected from that point. Since greatly changing the footfall position just before the footfall time causes an abrupt change in the free leg's trajectory, however, it is preferable to calculate the maximum possible recorrection as a function of the time remaining before footfall and then limit the rate of change in the correction amount based on this maximum.

Control passes to step S110 of the flow chart of FIG. 11 in which the target ZMP position is calculated from the target ZMP trajectory's parameters, to step S112 in which the positions/orientations of both feet are calculated from the target footfall position and other foot trajectory's parameters, to step S114 in which the position obtained by adding the product of θmdl and htrunk to the trunk's position of the target walking pattern is defined as the target trunk position (the target trunk orientation being that according to the target walking pattern), and to step S116 in which compliance control is conducted by correcting the model's foot.

The subroutine for this is shown in FIG. 12. First, in step S200, the detection value of the six-dimensional force and torque sensor 36 is read in. Control then passes to step S202 in which the actual ground reaction force moment Mact around the target ZMP position is calculated from the detected value, to step S204 in which the coordinate rotation angle (the virtual ground's inclinatory angular command) θctrl is calculated in the manner shown, and to step S206 in which the positions/orientations of both feet are rotated about the ZMP by the calculated amount to put them in the positions/attitudes of the feet of the geometric model. Since this control is explained in detail in the aforesaid earlier Japanese Patent Application No. 4(1992)-137,884 filed on Apr. 30, 1992, it will not be explained further here.

Control then passes to step S118 in the flow chart of FIG. 11 in which the joint displacements of the geometric model are calculated from the target trunk's position/orientation and the corrected foot's positions/orientations and to step S120 in which the joint displacements of the actual robot are controlled to follow the joint displacements of the geometric model.

As is clear from the foregoing, the present embodiment achieves stable walking by conducting discrete control of the inclination of the actual robot relative to the model and the inclinatory error of the dynamic model for the individual walking steps. Moreover, since it is the ZMP of the model that is deliberately shifted, the range over which the ZMP can be moved is greater than in the earlier proposed control and, consequently, it is possible to obtain a large attitude restoration force. As a result, attitude stability can be restored without loss of ground contactability even in cases where a disturbance of some type or other produces a very large inclinatory error. Further, when the attitude becomes unstable, the attitude of the model is first destabilized accordingly and is thereafter restored, while the actual robot is controlled to follow the attitude of the model. As a result, the attitude restoration can be achieved by smooth motions. In addition, since no interference arises between the model and the ground, the actual robot controlled to follow the model does therefore not experience interference with the ground either and, as a result, the footfall impact can be held to a low level.

Figure 13:
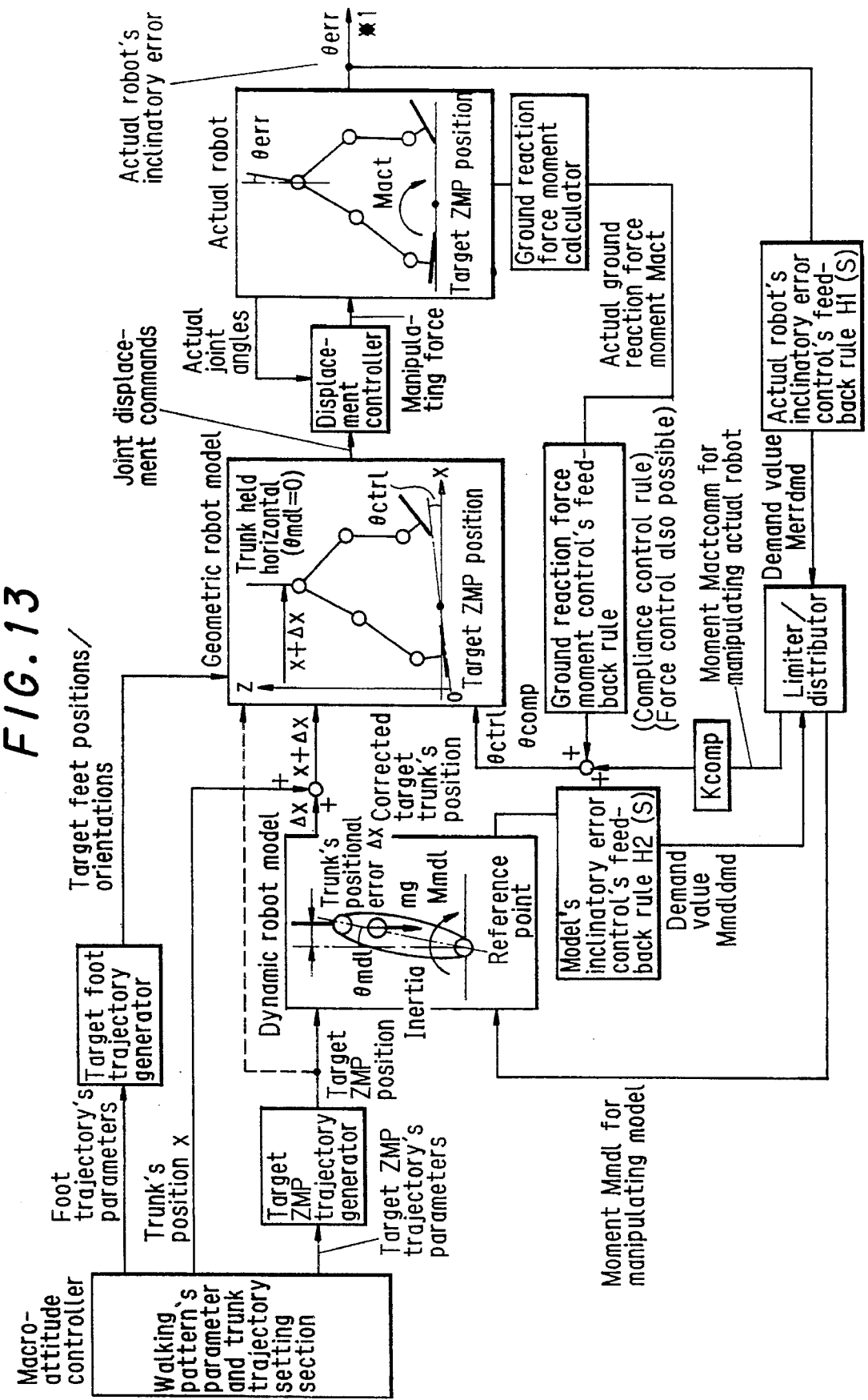
FIG. 13 is a block diagram showing the control according to a second embodiment of the invention.

FIG. 13 is a block diagram showing the control according to a second embodiment of the invention. While the first embodiment uses the footfall position as the manipulated variable Mmdl in the inclinatory control of the dynamic model, the second embodiment achieves stabilization by adding, to the Mmdl, a manipulated variable that is a function of the dynamic model's inclination.

Further, in the second embodiment, a demand value Merrdmd obtained by passing the inclinatory angular error θerr (and the angular velocity omega err omitted from illustration in FIG. 13 and on) of the actual robot relative to the geometric model through an actual robot's inclinatory error control's feedback rule H1 (S) of the PD type or the like (i.e. Merrdmd=H1 (S) θerr) and another demand value Mmdldmd obtained by passing the inclinatory angle θmdl of the dynamic model through a model's inclinatory error control's feedback rule H2 (S) (i.e. Mmdldmd=H2 (S) θmdl) are passed through a limiter and a distributor and distributed to determine a moment Mactcomm for manipulating actual robot about the target ZMP position and the moment Mmdl for manipulating model.

Figure 14:
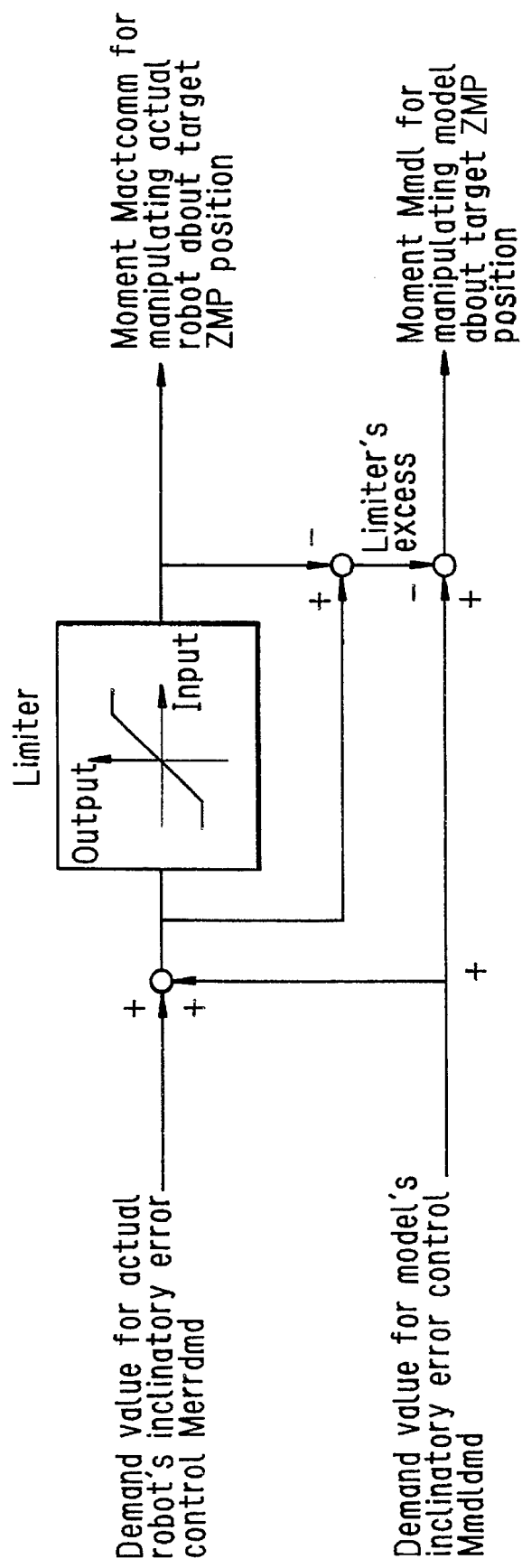
FIG. 14 is a block diagram showing a limiter and a distributor used in the second embodiment and illustrated in FIG. 13.

The limiter and distributor are shown in FIG. 14. In this embodiment, the moment Mactcomm for manipulating actual robot is obtained by passing the sum of the demand values Merrdmd and Mmdldmd through the limiter. This limiter ensures the ground contactability of the actual robot by preventing the ground reaction force (the ZMP) of the actual robot from moving outside the permissible region. (During level ground walking, the permissible region for the ground reaction (the ZMP) is that within the minimum convex polygon including the ground contact surface, as mentioned earlier.)

The moment Mmdl for manipulating model is obtained by adding the excess of the limiter input to the demand value Mmdldmd and, as in the first embodiment, is input to the dynamic model. The ground reaction force moment's feedback rule obtains a ground reaction force moment feedback's manipulated variable θcomp from the actual ground reaction force moment Mact about the target ZMP position. The virtual ground's inclination angular command θctrl is obtained by adding the ground reaction force moment feedback's manipulated variable θcomp to the product of the moment Mactcomm and the compliance constant Kcomp, as will be explained with reference to FIG. 17. As for the foot position of the geometric model, the foot position of the target walking pattern generated by the target foot trajectory generator is coordinate-rotated about the target ZMP position by the amount of the virtual ground's inclinatory angular command θctrl.

It is the difference between the actual ground force moment Mact about the target ZMP position and the moment Mmdl for manipulating model that determines the behavior of the actual robot's inclinatory angular error θerr. If the compliance control results adequate softness, Mact nearly coincides with the moment Mactcomm for manipulating actual robot. In such case, it can therefore be assumed that the behavior of the actual robot's inclinatory angular error θerr is the difference between Mactcomm and Mmdl. Since the difference between Mactcomm and Mmdl is always Merrdmd irrespective of whether or not the limiter is in operation, the control constantly functions to converge the actual robot's inclinatory angular error θerr relative to the geometric model on zero.

On the other hand, it is Mmdl that determines the behavior of the model's inclinatory angle θmdl. When the limiter is not in operation, Mmdl equals Mmdldmd, and the control constantly functions to converge the model's inclination on zero. When the limiter is in operation, priority is given to converging the actual robot's inclinatory angular error θerr with respect to the geometric model on zero, and the model's inclination θmdl is converged on zero to the extent possible. If the demand value Merrdmd is very large relative to the limiter setting, the model's inclination control is sacrificed and the model's inclination tends to diverge. More specifically, the dynamic model's inclination control is conducted only when the actual robot's ZMP is well within the limits of the permissible region. Therefore, while the dynamic model can restore the upright state against instantaneous or minute disturbances, it is unable to restore it against large disturbances of long duration, so that the attitude of the geometric model becomes very unstable and tips over. Since the foot trajectories are in accord with the target walking pattern, however, the second embodiment is highly appropriate for use when the footfall position is constrained, as during walking on stairs or stepping-stones.

The setting of the inclination control's gain of the dynamic model will now be explained. The control rule for converging the model's inclinatory angle θmdl on zero is given in the form of Eq. 17, for example.

$$Mmdldmd = -K\omega \cdot \omega mdl - K\theta \cdot \theta mdl \qquad \text{Eq. 17}$$

A simple inverted pendulum allowed to move freely from its current state without application of a moment about its pivot point can be made to assume a stationary upright condition only if the current total energy is equal to the total energy in the upright stationary state. In other words, Eq. 18 has to be satisfied.

$$\tfrac{1}{2} \cdot I \cdot \omega mdl^2 \cdot mgh \cdot \sin(\theta mdl) \cdot \tan(\theta mdl) \qquad \text{Eq. 18}$$

Further, since omega mdl and θmdl have to be of opposite polarity for bringing the inverted pendulum toward the upright state, Eq. 19 has to be satisfied.

$$\theta mdl \cdot \omega mdl \leq 0 \qquad \text{Eq. 19}$$

From Eqs. 18 and 19, Eq. 20 will be obtained.

$$\omega mdl = -\sqrt{\frac{2\,m\,g\,h}{I} \cdot \sin(\theta mdl) \cdot \tan(\theta mdl)} \qquad \text{Eq. 20}$$

Eq. 20 can be approximated as Eq. 21.

$$\omega mdl = -\sqrt{\frac{2\,m\,g\,h}{I}} \cdot \theta mdl \qquad \text{Eq. 21}$$

If the state satisfies Eq. 21, the dynamic model assumes a stationary upright state even without applying the moment Mmdl about the pivot point. Therefore, if the control rule is established so that the demand value Mmdldmd becomes zero in the state satisfying Eq. 21, it becomes possible to converge on the upright state without producing the moment Mmdl in the dynamic model any more often than necessary. The control rule of this type which satisfies Eq. 17 will be expressed as Eq. 22.

$$Mmdldmd = -K\omega \cdot \omega mdl - K\omega \cdot \sqrt{\frac{2\,m\,g\,h}{I}} \cdot \theta mdl \qquad \text{Eq. 22}$$

where K omega is an arbitrary positive constant.

Even if Eq. 22 is satisfied, the inverted pendulum model will exhibit overshoot behavior if K omega is set somewhat small. If K omega is set smaller still, the gravitational force moment prevails and restoration to the upright state becomes impossible. For ensuring restoration to the upright state without giving rise to overshooting, the characteristic root of the feedback loop has to be a negative real number, which requires K omega to satisfy Eq. 23.

$$K\omega \geq (2 + 2\sqrt{2})\sqrt{m\,g\,h \cdot I} \qquad \text{Eq. 23}$$

If the gain is set to satisfy Eqs. 22 and 23, the demand value Mmdldmd is held to a small absolute value so that the moment Mactcomm is held to a small absolute value. The ground contactability of the actual robot is thus enhanced.

Figure 15:
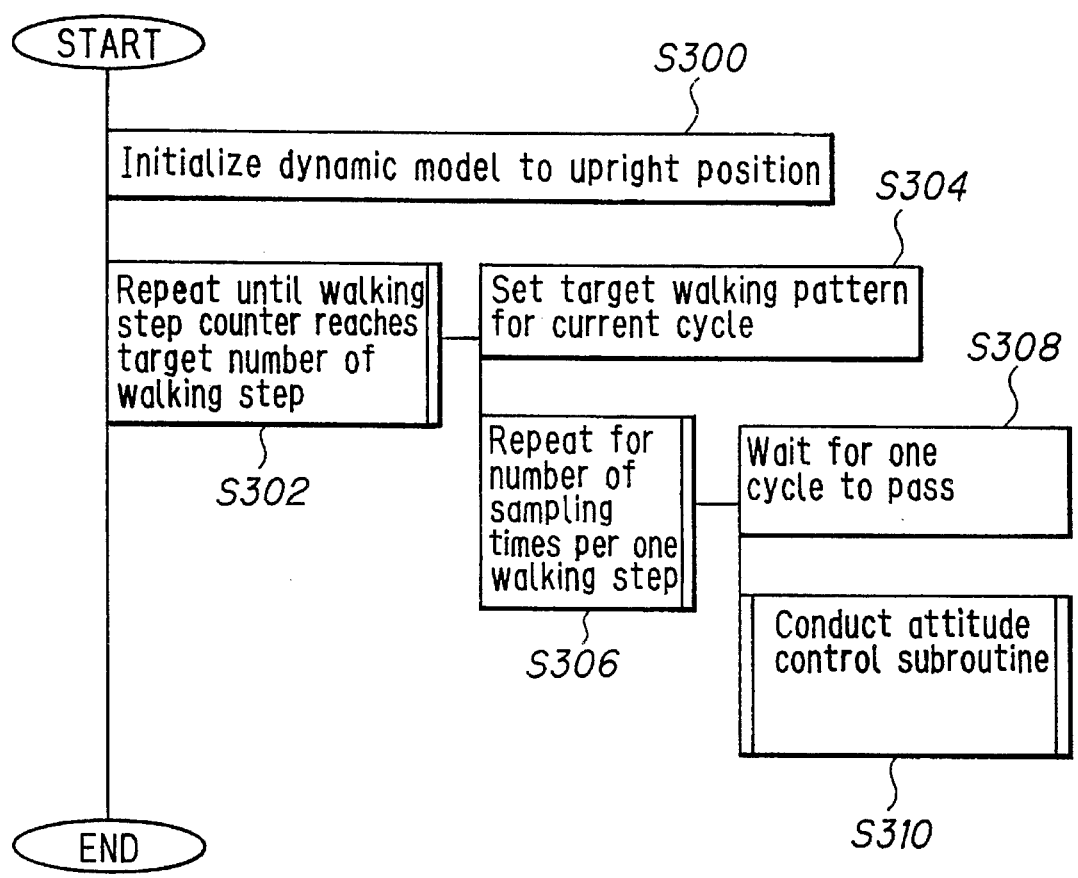
FIG. 15 is a flow chart showing a main routine of the control of FIG. 13.
Figure 16:
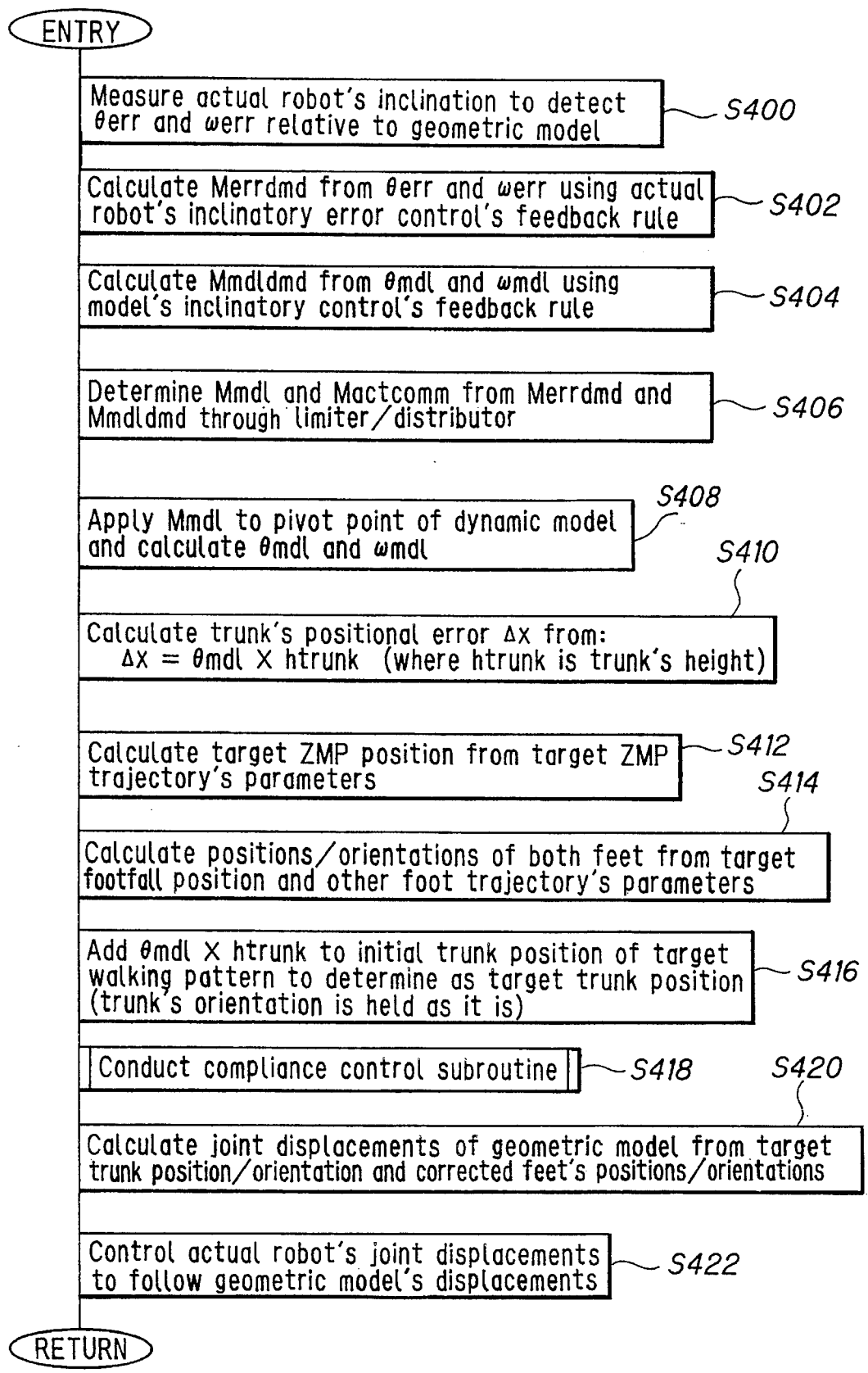
FIG. 16 is a flow chart showing a subroutine of attitude control procedures of FIG. 15.
Figure 17:
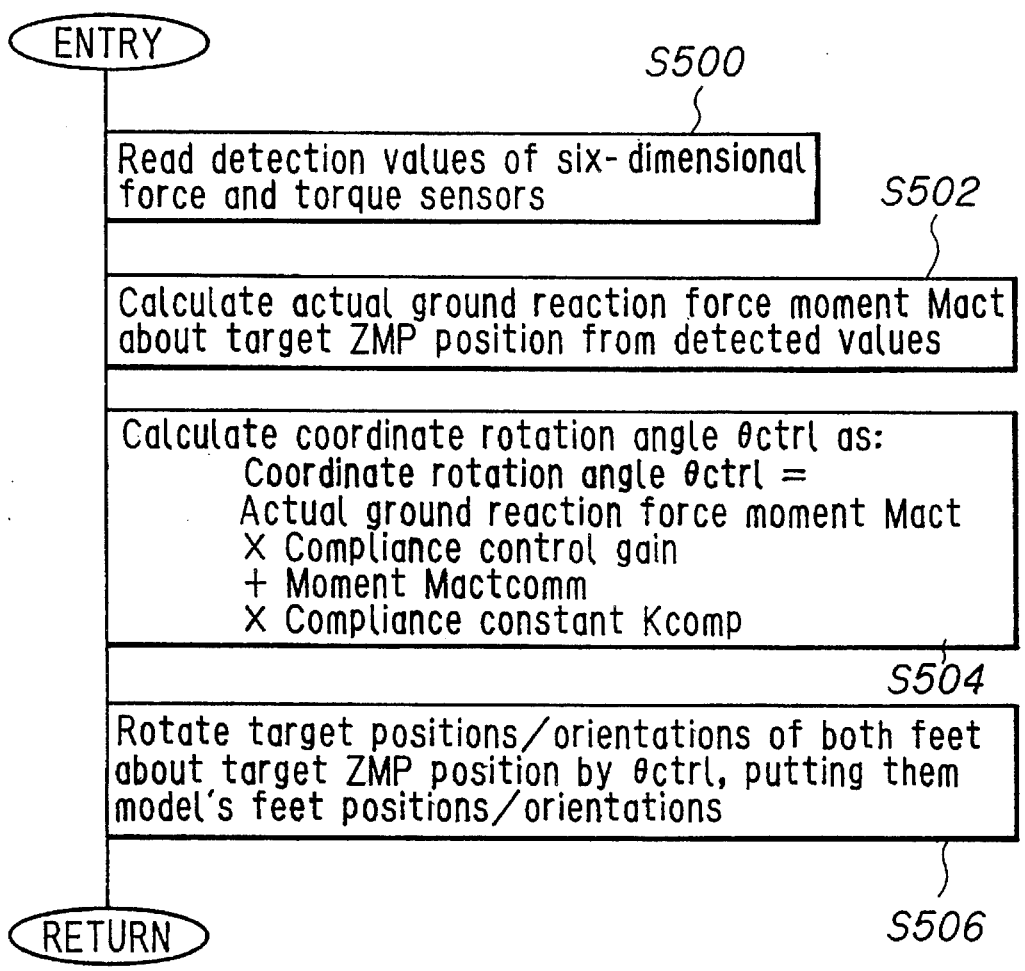
FIG. 17 is a flow chart showing a subroutine of compliance control procedures of FIG. 16.

FIGS. 15 to 17 are flow charts showing the control according to the second embodiment of the invention. Steps S300 to S310 of FIG. 15 make up the main routine, steps S400 to S422 of FIG. 16 a subroutine of the attitude control procedures of the main routine, and steps S500 to S506 of FIG. 17 a subroutine of the compliance control procedures of the main routine. The explanation will focus on the points of the second embodiment that distinguish it from the first. Steps S304 to S306 of the flow chart of FIG. 15 include nothing corresponding to steps S16 to S20 of FIG. 10 of the first embodiment. This is because the attitude control subroutine does not conduct footfall's positional correction. Moreover, comparing the attitude control subroutine flow chart of FIG. 16 with the flow chart of FIG. 11, in light of the configuration of the second embodiment described in the foregoing, the flow chart of FIG. 16 additionally includes steps S402 to S406 but does not include a step corresponding to S108 of the first embodiment. On the other hand, in the subroutine flow chart of FIG. 17, the coordinate rotation angle computation of step S504 involves the aforesaid operation of adding to the coordinate rotation angle the product of the moment Mactcomm and the compliance constant Kcomp. The remainder of the configuration is the same as that of the first embodiment.

The fact that its foot trajectory remains unchanged from that of the target walking pattern makes the second embodiment preferable for use in circumstances where the footfall position is constrained, as during walking on stairs or stepping-stones.

Figure 18:
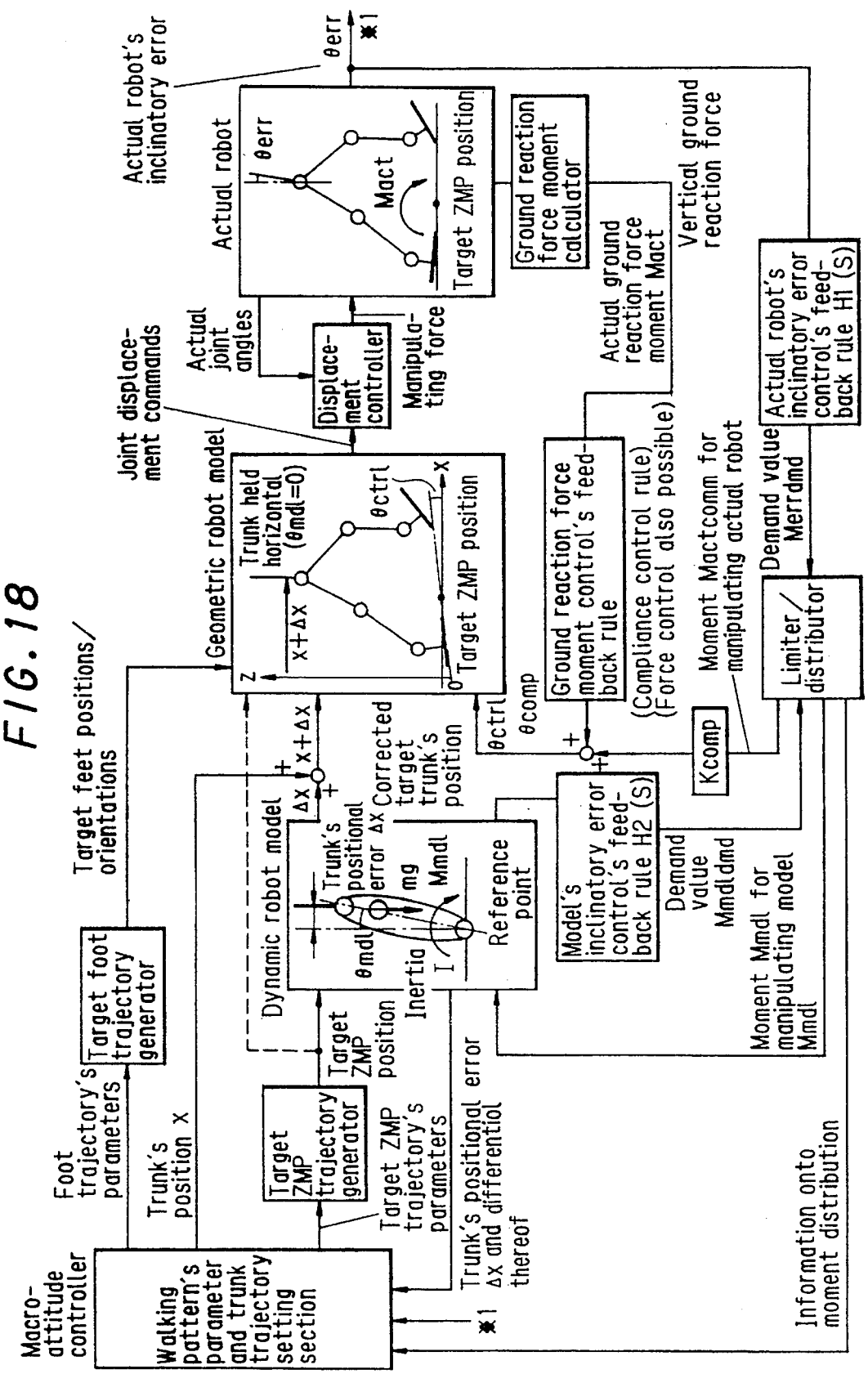
FIG. 18 is a block diagram showing the control according to a third embodiment of the invention.

FIG. 18 is a block diagram showing the control according to a third embodiment of the invention. The third embodiment combines the methods of the first and second embodiments as regards the inclination control of the dynamic model. Here, in restoring the dynamic model to the upright state, as against instantaneous and minute disturbances, the main role is played by the control achieved by applying the moment Mmdl to the dynamic model, while as against large disturbances of long duration, the main role is played by the control achieved by correcting the footfall's position and time.

As in the first embodiment, the footfall's positional and time correctional amounts are determined in the third embodiment so as to cause the dynamic model to return to the upright state. While it would appear that the model behavior's prediction would be more complicated than in the first embodiment because of the effect of the demand value Mmdldmd, the fact that the demand value Mmdldmd suppresses divergence of the dynamic model actually makes the prediction's accuracy higher. In particular, if the dynamic model's inclination control's gain setting of the second embodiment (gain setting satisfying Eqs. 22 and 23) is adopted, the demand value Mmdldmd becomes zero when the total energy of the dynamic model is equal to the total energy at the time of upright standing, which makes it possible to adopt without modification the method explained with respect to the first embodiment of determining the amount of change so that the predicted value of the total energy of the dynamic model at the instant of footfall coincides with the total energy at the time of upright standing.

Figure 19:
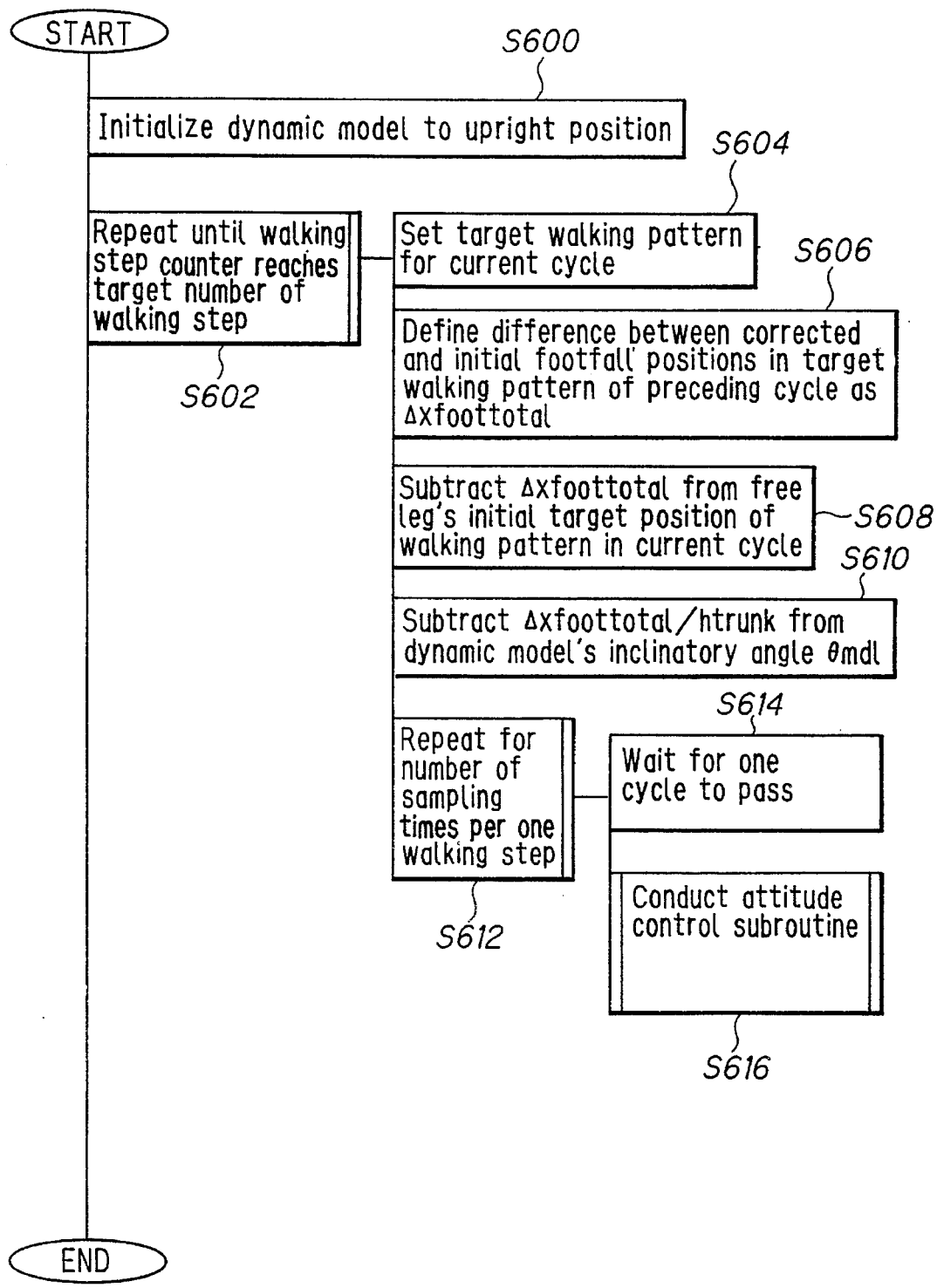
FIG. 19 is a flow chart showing a main routine of the control of FIG. 18.
Figure 20:
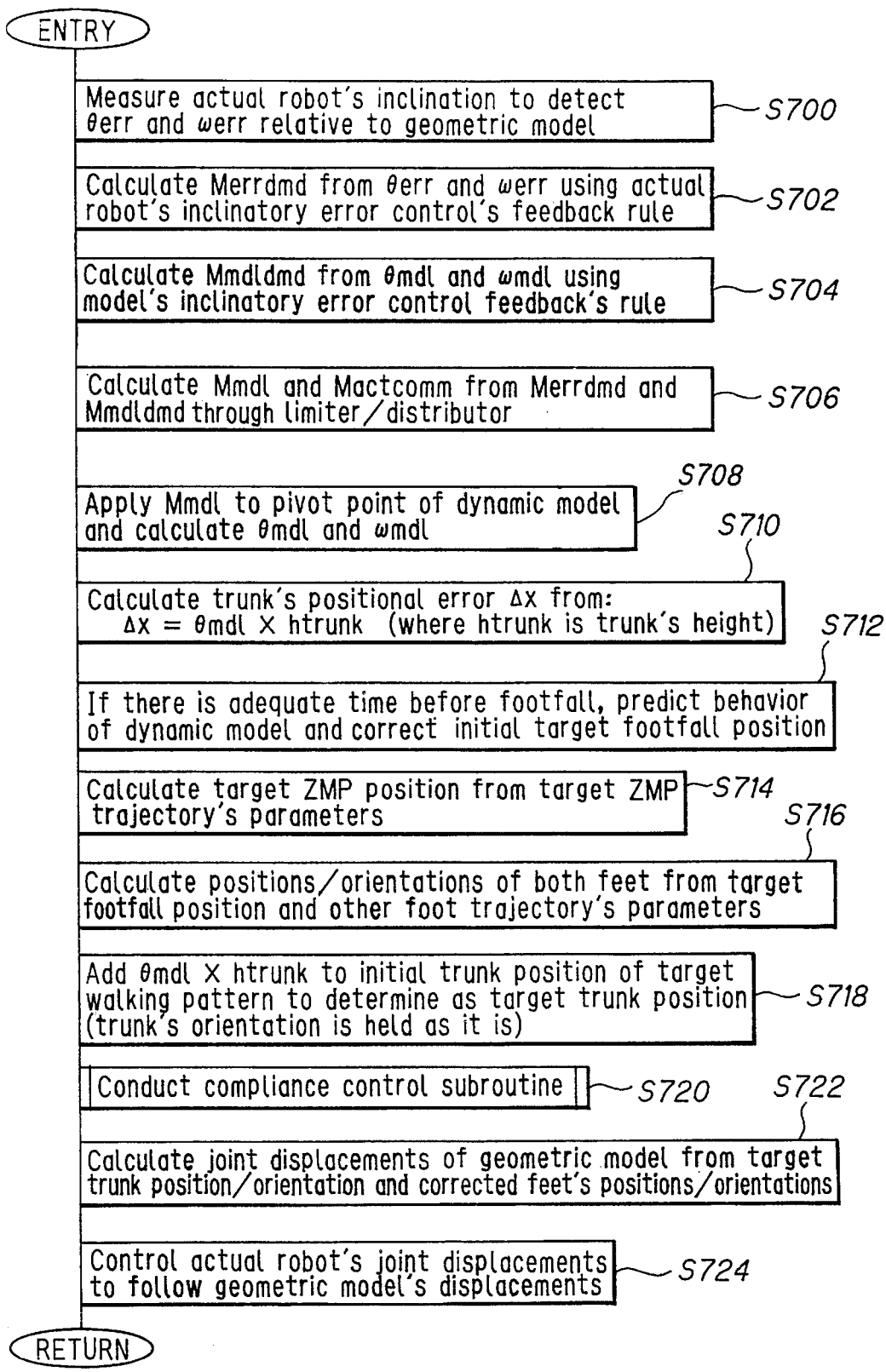
FIG. 20 is a flow chart showing a subroutine of attitude control procedures of FIG. 19.
Figure 21:
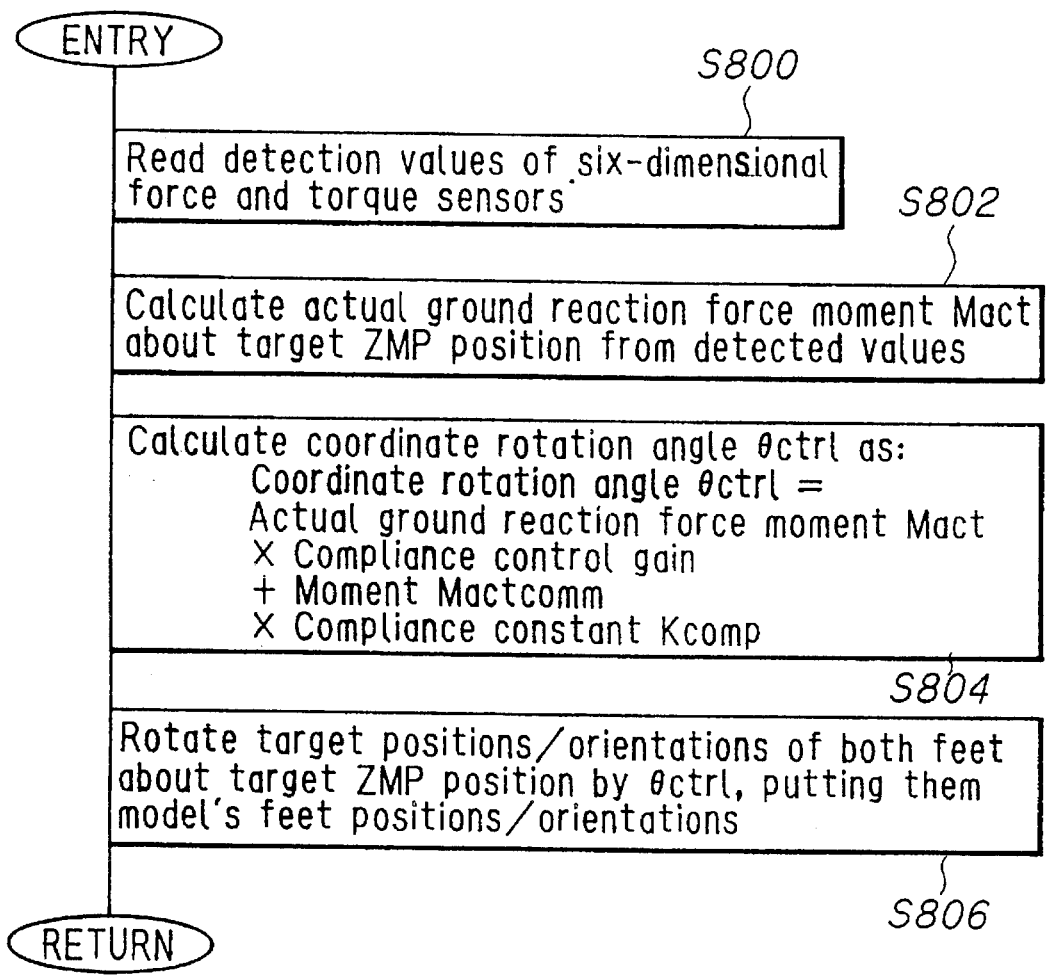
FIG. 21 is a flow chart showing a subroutine of compliance control procedures of FIG. 20.

Steps S600 to S616 of FIG. 19 make up the main routine, steps S700 to S724 of FIG. 20 a subroutine of the attitude control procedures of the main routine, and steps S800 to S806 of FIG. 21 a subroutine of the compliance control procedures of the main routine. The main routine flow chart of FIG. 19 is the same as the corresponding flow chart of the first embodiment and the subroutine flow chart of FIG. 21 is the same as the corresponding flow chart of the second embodiment. The attitude control subroutine flow chart of FIG. 20 differs from the corresponding flow chart of the second embodiment only in that it includes a step S712 for correction of the target footfall position. The remainder of the configuration is the same as that of the earlier embodiments.

As explained earlier, in the third embodiment restoration of the dynamic model to the upright state against instantaneous and minute disturbances relies mainly on the control achieved by applying the moment Mmdl to the dynamic model, while restoration thereof against large disturbances of long duration relies mainly on the control achieved by correcting the footfall's position and time. As a result, the amount of footfall's positional correction and, accordingly, the amount of stagger become smaller than in the first embodiment, while stability is enhanced over both the first and second embodiments.

Figure 22:
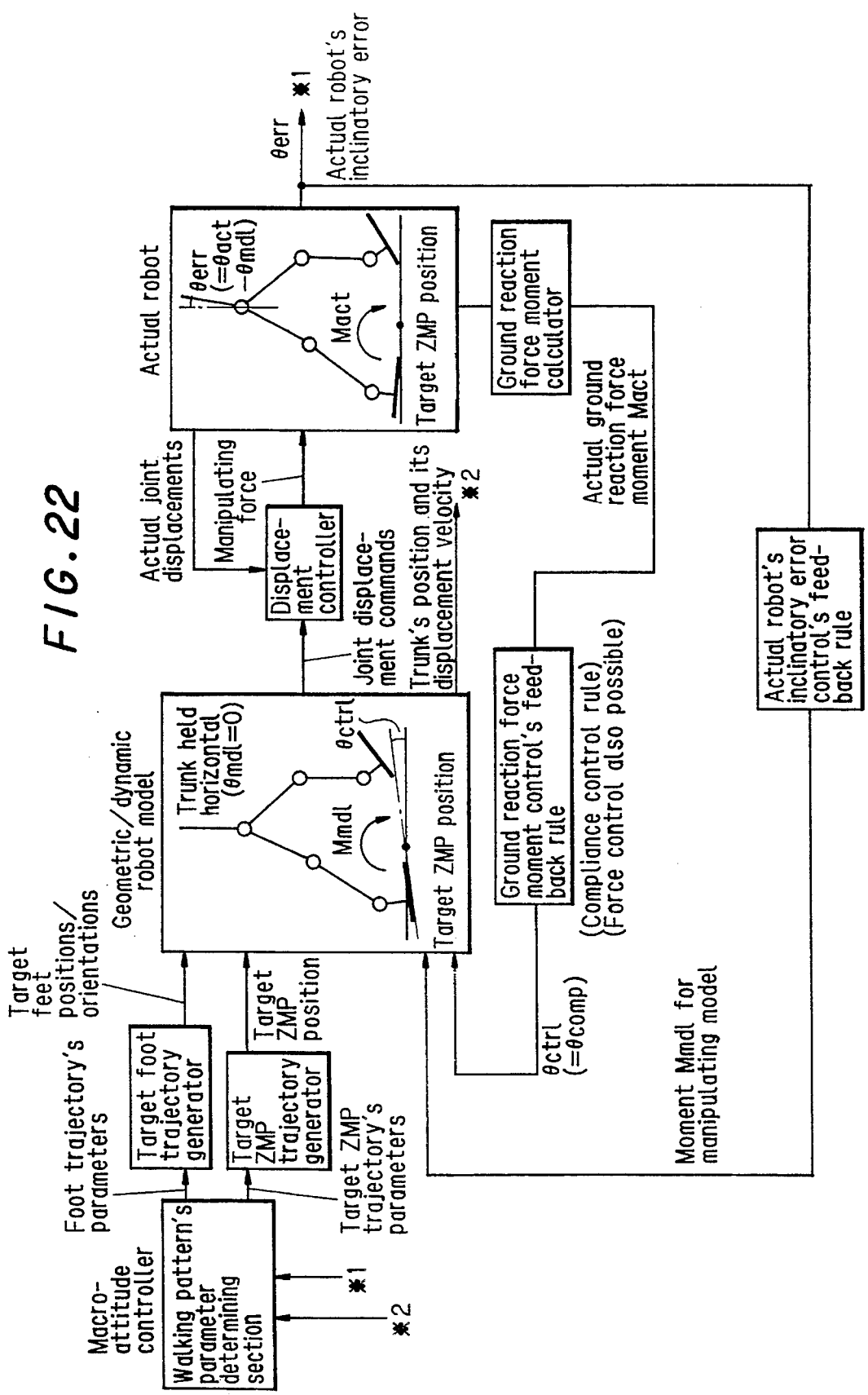
FIG. 22 is a block diagram showing the control according to a fourth embodiment of the invention.

FIG. 22 is a block diagram showing the control according to a fourth embodiment of the invention. The first to third embodiments are each provided separately with the dynamic model for the trunk's positional perturbation component relative to the target walking pattern and with the geometric model expressing the relationship of the trunk's and foot's positions to the joint angles. In contrast, the fourth embodiment is provided with a composite dynamic and geometric model comprising of rigid links. In other respects, aside from the specifics of the macro-attitude controller to be explained below, its configuration is substantially the same as that of the first embodiment.

In the fourth embodiment, the walking pattern is expressed in terms of the target ZMP position and the positions/orientations of both feet. As regards the positions/orientations of the feet, for each walking step, foot trajectory's parameters (e.g., the free leg's footfall position, footfall time etc.) are supplied from the macro-attitude controller to the target foot trajectory generator which generates the instant-by-instant positions and orientations of the individual feet in real time. As regards the target ZMP trajectory, for each walking step, the target ZMP trajectory's parameters are supplied from the macro-attitude controller to the target ZMP trajectory generator which calculates the instant-by-instant position of the target ZMP in real time. As regards the trunk's position/orientation, while the first to third embodiments time series data created offline in advance so as to satisfy the target ZMP trajectory is stored in the macro-attitude controller, in the fourth embodiment the trunk's position/orientation are generated in real time on the basis of the feet positions/orientations of the geometric and dynamic model, the target ZMP trajectory and the aforesaid moment Mmdl.

In the robot model of the fourth embodiment, the feet positions/orientations are transformed to the positions/attitudes obtained by coordinate-rotating the foot positions/orientations supplied by the foot trajectory generator by the amount of the virtual ground's inclinatory angular command θctrl. In the robot model, the trunk's position and orientation are obtained by kinematic calculation such that the ground reaction force moment Mact at the target ZMP position becomes the moment Mmdl, and the displacements of the respective joints are simultaneously calculated. When Mmdl is zero, the ZMP of the robot model coincides with the target ZMP position. When Mmdl is not zero, however, a moment is produced about the target ZMP position, meaning that the target ZMP position is no longer at the robot model's ZMP position and thus that the robot model's ZMP position is shifted away from the target ZMP position.

It is assumed that the model's ground surface is able to produce all types of overall ground reaction forces. Namely, the model's ground surface is assumed to be capable of producing an attractive force such that, for example, the model's ground contact surface will not separate from the ground (the prescribed constraint condition between the leg and the ground will be maintained) even if during level ground walking the ZMP moves outside the minimum convex polygon including the ground contact surface. As a result of this assumption, it becomes possible to produce a large restoration of a magnitude not attainable by manipulation of only the actual robot's overall ground reaction force. By increasing the feedback gain it therefore becomes possible to converge the error on zero in a short period of time. That is to say, in the actual robot not only the joint displacements but also the inclination follow those of the model with high response. It should be noted, however, that the component of the model's overall ground reaction force normal to the ground should be directed upward (in the positive direction) because otherwise the actual robot is liable to rise off the ground momentarily.

The macro-attitude controller of the fourth embodiment determines the next footfall's position and timing, the target ZMP trajectory and other walking pattern's parameters on the basis of the behavior of the model, the inclinatory error of the actual robot relative to the model, and the like. Since the first to third embodiments are provided with the target walking pattern, they need only to determine the error amount from the target walking pattern. Since the fourth embodiment does not have the target walking pattern, however, the determination of the walking pattern's parameters becomes difficult. For making the determination as simple as possible, it suffices to focus on macro-state quantities such as the angular momentum and the position of the center of gravity of the robot as a whole as viewed from a given reference point. If the local attitude control does not much affect these macro-state quantities, it is possible to predict the future behavior from only the macro-state quantities and to determine the walking pattern's parameters so that the macro-state quantities do not diverge. To be specific, it is possible to use the earlier mentioned method employed for footfall's positional control in biped stilt robots or to use a method in which simulations are conducted for advance learning of footfall's positions appropriate for the macro-state quantities.

In the robot according to the fourth embodiment, the reaction of the free leg can be ignored during slow walking and the robot can be simulated as a simple inverted pendulum. It is known that when the robot can be simulated as a simple inverted pendulum the locus in the case where the angular momentum is represented on the vertical axis and the position of the center of gravity on the horizontal axis is a hyperbola. The robot's behavior can therefore be analytically predicted and the footfall's position determination can also be conducted analytically. This is the method used in the aforesaid footfall's position control of the biped stilt robot. When the robot according to the fourth embodiment walks rapidly (at 3 km/h, for example), the free leg's reaction cannot be ignored and the simulation as a simple inverted pendulum becomes impossible. In this case, rather than using an analytical determination method it is more effective to use one in which footfall's positions appropriate for the macro-state quantities are learned in advance. The learning can be achieved by artificial intelligence, fuzzy logic, neuro networks or the like.

Figure 23:
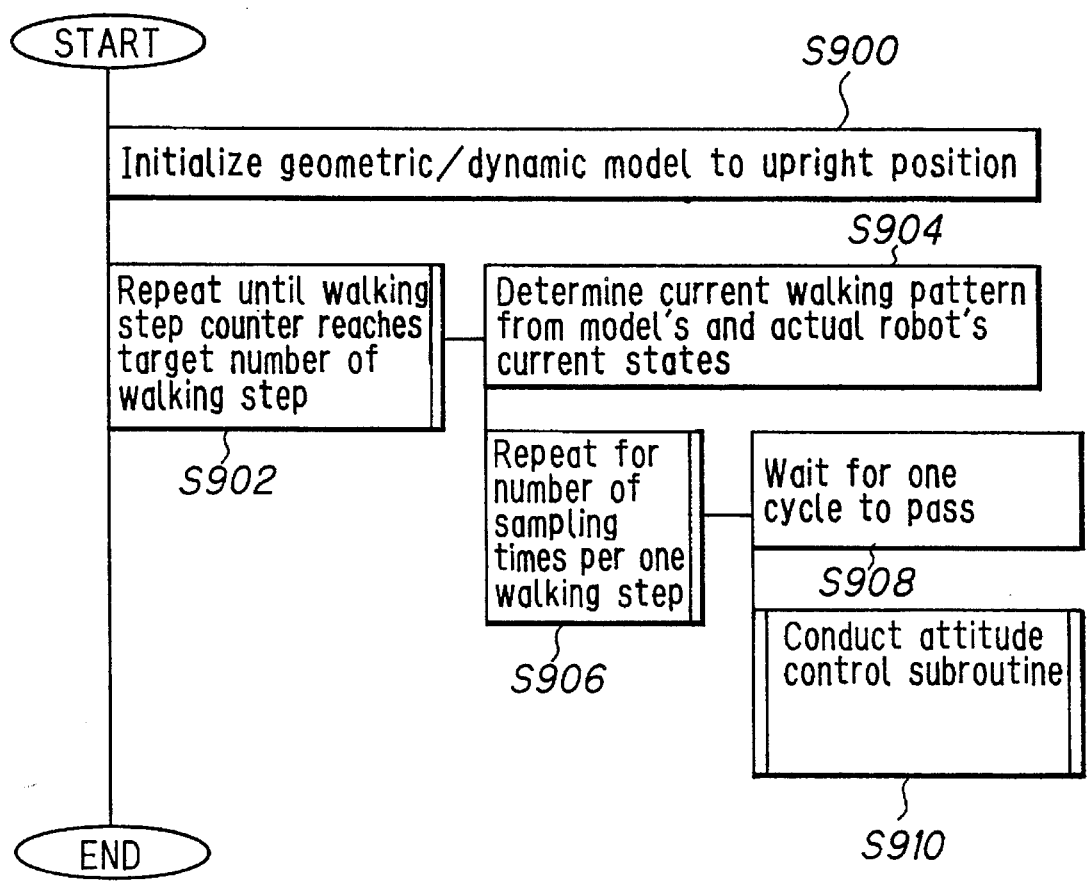
FIG. 23 is a flow chart showing a main routine of the control of FIG. 22.
Figure 25:
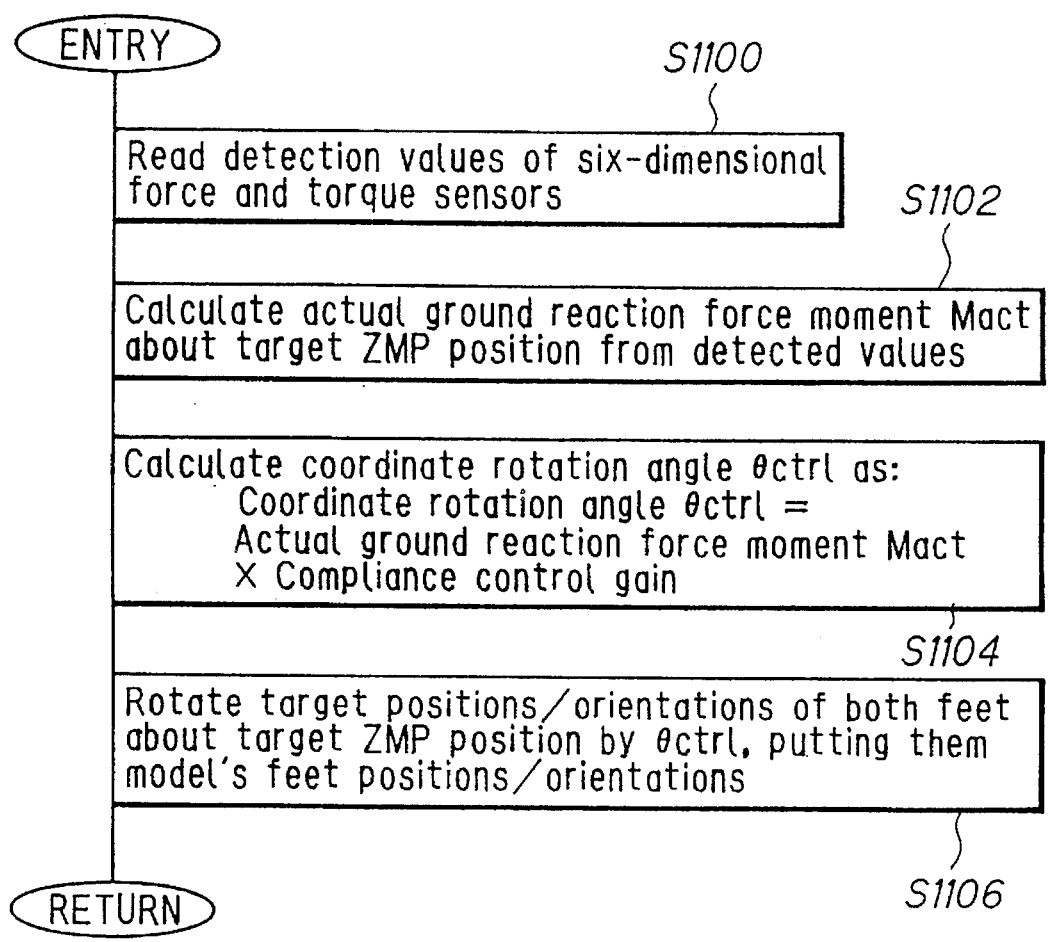
FIG. 25 is a flow chart showing a subroutine of compliance control procedures of FIG. 24.

Steps S900 to S910 of FIG. 23 make up the main routine, steps S1000 to S1014 of FIG. 24 a subroutine of the attitude control procedures of the main routine, and steps S1100 to S1106 of FIG. 25 a subroutine of the compliance and attitude stabilization control procedures of the main routine of the fourth embodiment. The subroutine flow chart of FIG. 25 is the same as the corresponding one of the first embodiment.

Since the fourth embodiment has a more precise dynamic model than the first embodiment, it provides more accurate attitude control. It is particularly characterized in that it is able to resist tip-over and achieve recovery even when the robot is exposed to a large disturbance which greatly destabilizes its attitude.

Figure 26:
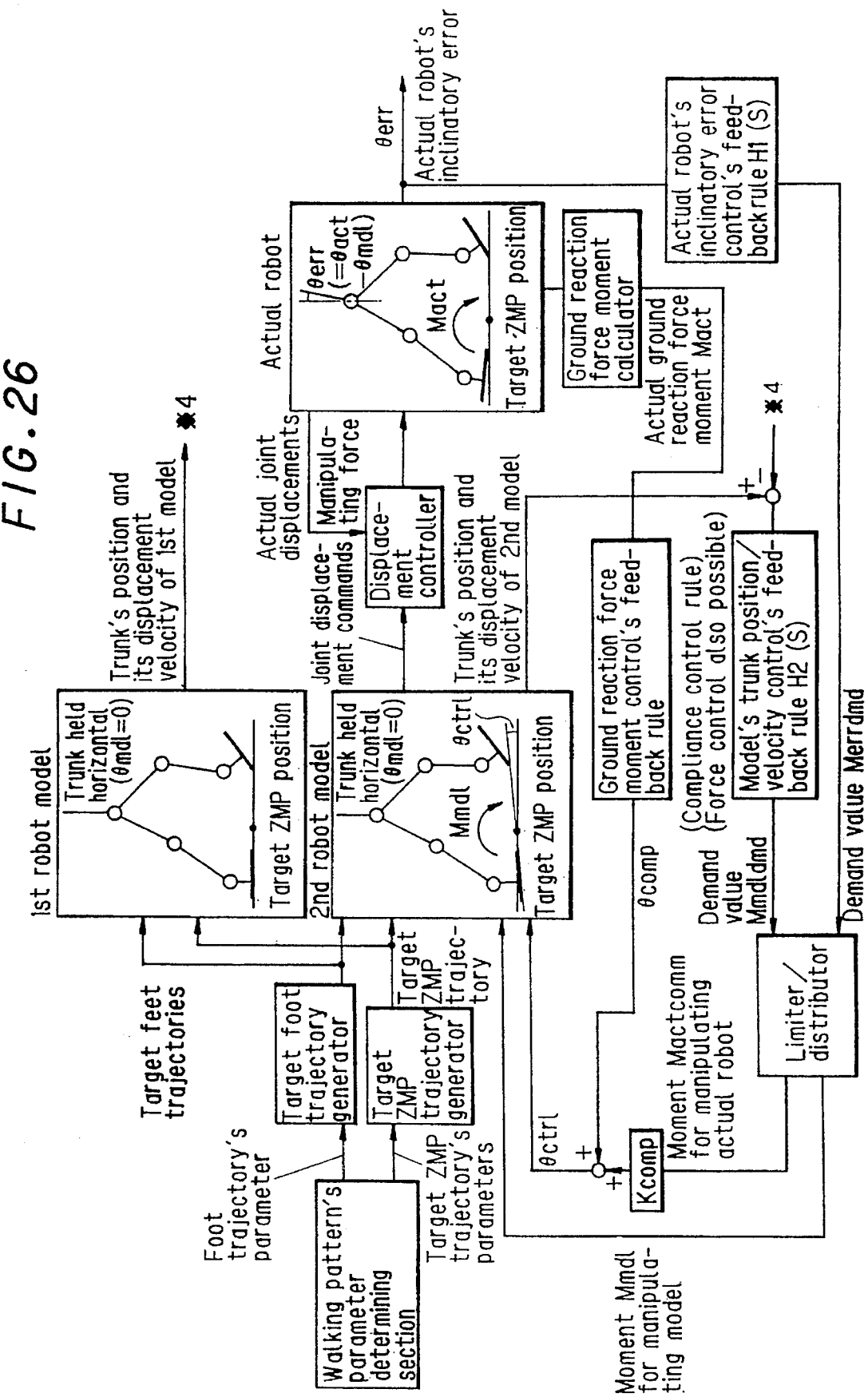
FIG. 26 is a block diagram showing the control according to a fifth embodiment of the invention.

FIG. 26 is a block diagram showing the control according to a fifth embodiment of the invention. This embodiment does not have the macro-attitude controller and a walking pattern's parameter determining section merely outputs a series of walking pattern's parameters preset to enable long-term stable walking under disturbance free conditions.

The fifth embodiment is provided with a first and a second geometric/dynamic models. The initial states of the first and second models are set to be the same as the initial states of the aforesaid series of the preset walking patterns. The first model is supplied with the target foot trajectories and the target ZMP trajectory and generates the trunk trajectory so as to satisfy the target ZMP trajectory. Since, as mentioned above, the walking pattern's parameter determining section outputs a series of walking pattern parameters preset to enable long-term stable walking under disturbance free conditions, the behavior of the first model is a faithful reproduction of the walking pattern. In addition to being supplied with the target foot trajectories and the ZMP trajectories, the second model is also supplied with a manipulated variable for converging the trunk's positional error between the first and second models on zero and with a manipulated variable for converging the attitude inclinatory error between the second model and the actual robot on zero. The manipulated variables are applied as the aforesaid moment Mmdl about the target ZMP position.

In the embodiment, the demand value Merrdmd obtained by passing the inclinatory angular error θerr of the actual robot relative to the second model through the actual robot's inclinatory error control's feedback rule H1 (S) of the PD type or the like and the demand value Mmdldmd obtained by passing the positional error between the first and second models through a model's trunk position/velocity control's feedback rule H2 (S) concerning the trunk's positional error between the first and second models are passed through a limiter and distributor of the same type as used in the second embodiment and distributed to the moment Mactcomm and the moment Mmdl.

The ground reaction force moment' control's feedback rule calculates the ground reaction force moment's feedback manipulated variable θcomp from the actual ground reaction force moment Mact about the target ZMP position. The virtual ground's inclinatory angular command θctrl is obtained by adding the manipulated variable θcomp to the product of moment Mactcomm and the compliance constant Kcomp. As for the feet positions of the second model, the feet positions generated by the target foot trajectory generator are coordinate-rotated about the target ZMP position by the amount of the virtual ground's inclination angular command θctrl.

The first and second models are both the same as the model of the fourth embodiment. However, since the first model is not provided with the moment Mmdl and the virtual ground's inclinatory angular command θctrl, when the first and second models are to be created using the same program, therefore, it suffices to input the values of the moment Mmdl and command θctrl to the first model zero.

Figure 27:
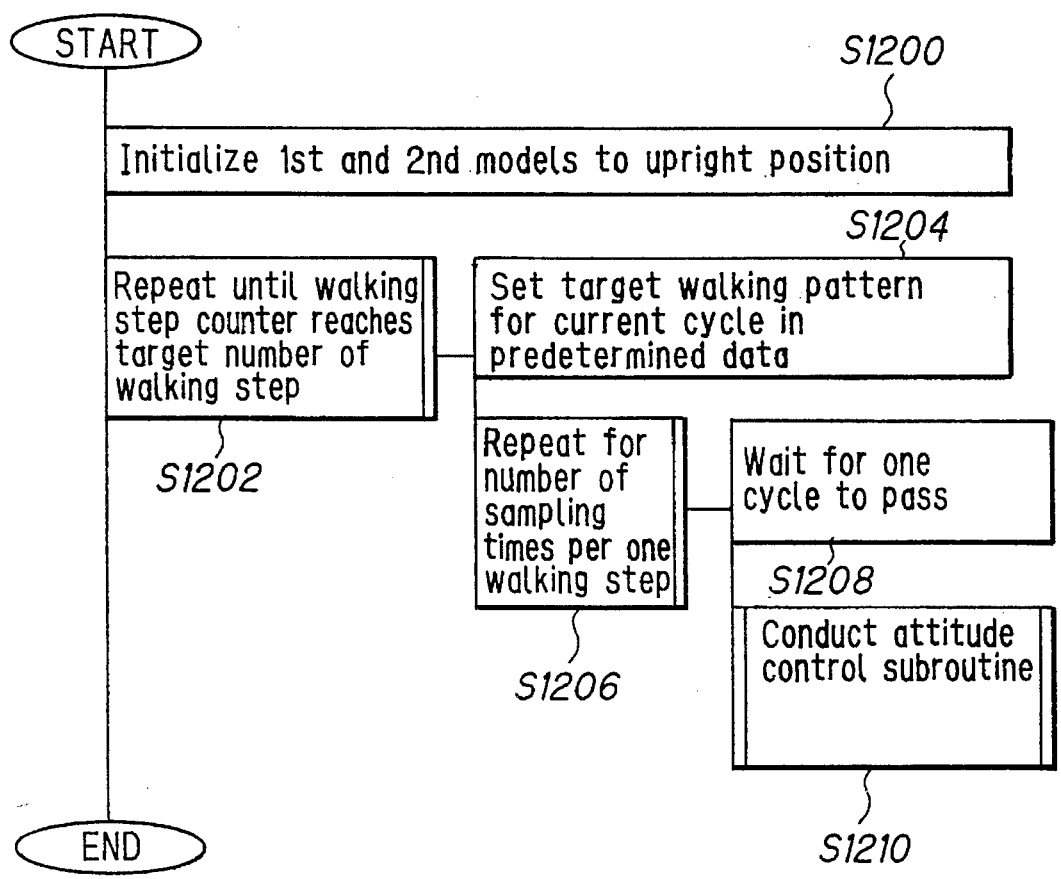
FIG. 27 is a flow chart showing a main routine of the control of FIG. 26.
Figure 28:
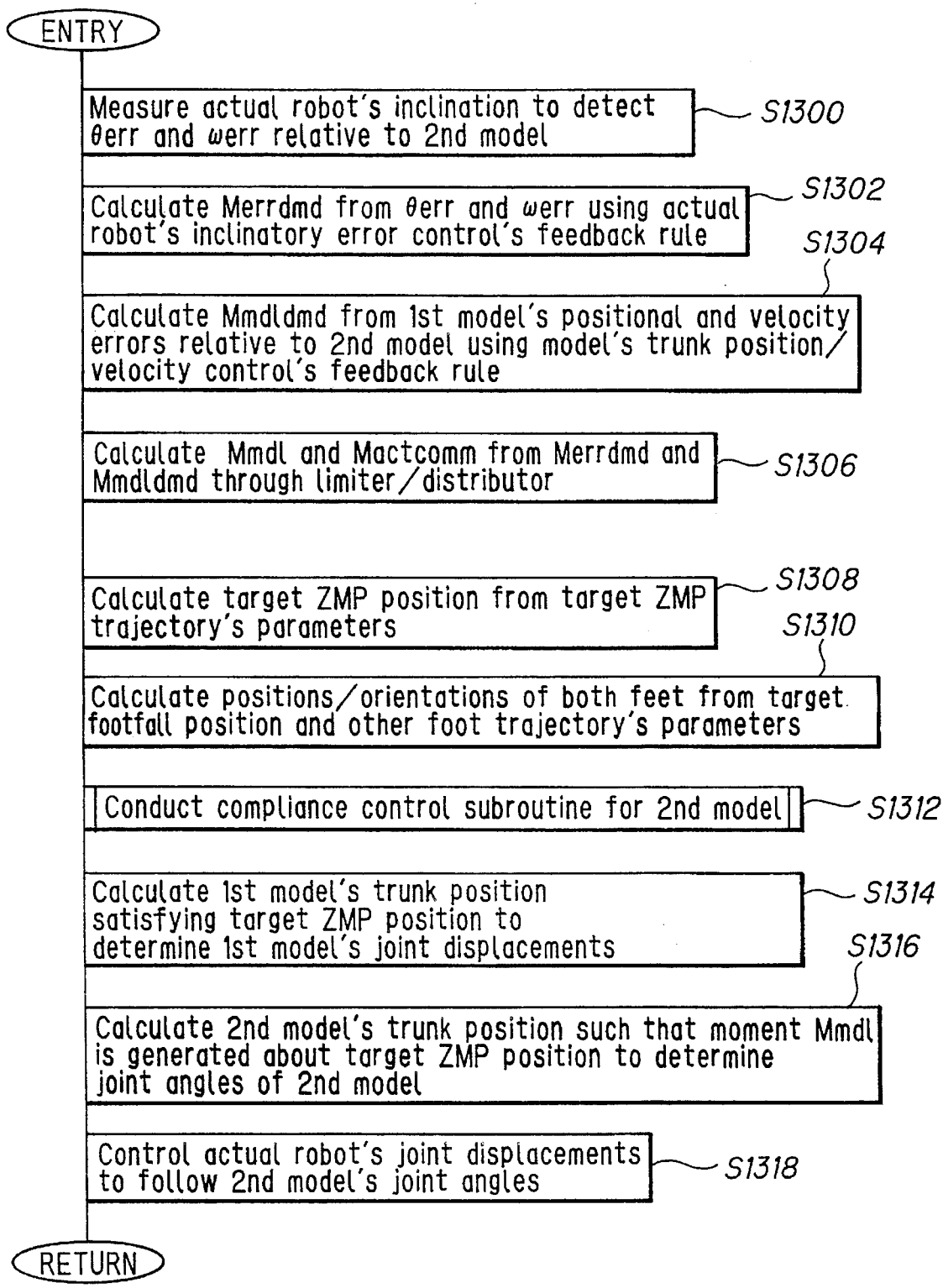
FIG. 28 is a flow chart showing a subroutine of attitude control procedures of FIG. 27.
Figure 29:
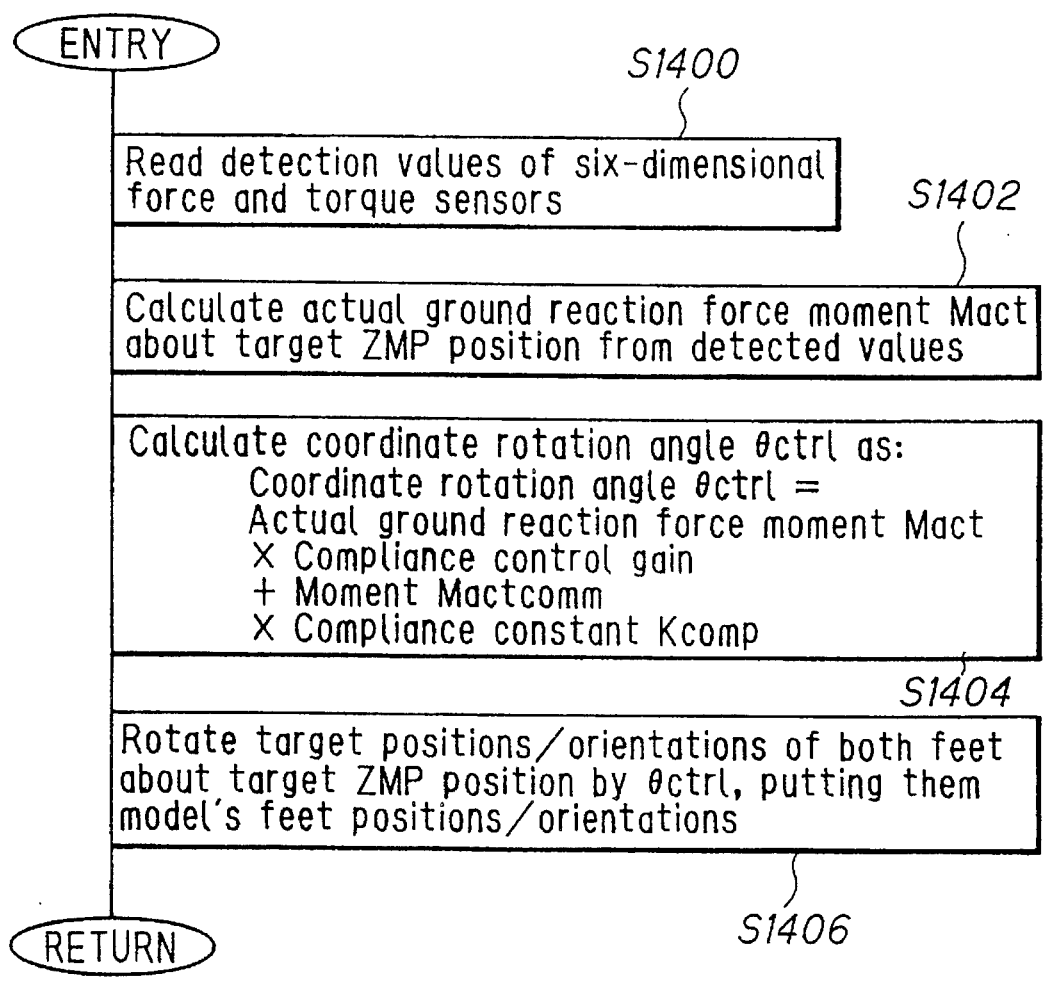
FIG. 29 is a flow chart showing a subroutine of compliance control procedures of FIG. 28.

Steps S1200 to S1210 of FIG. 27 make up the main routine, steps S1300 to S1318 of FIG. 28 a subroutine of the attitude control procedures of the main routine, and steps S1400 to S1406 of FIG. 29 a subroutine of the compliance control procedures of the main routine of the fifth embodiment. These flow charts are substantially the same as those of the second embodiment.

Although, in the second embodiment, the trunk trajectory was generated in advance, in the fifth embodiment, on the other hand, the trunk trajectory is generated in real time in the first model so as satisfy the target ZMP trajectory. The effect of the fifth embodiment is essentially the same as that of the second embodiment. However, since its dynamic model is more faithful to the robot's behavior, it achieves more precise attitude stabilization control and is able to restore the model's attitude even when it is has been greatly destabilized.

Figure 30:
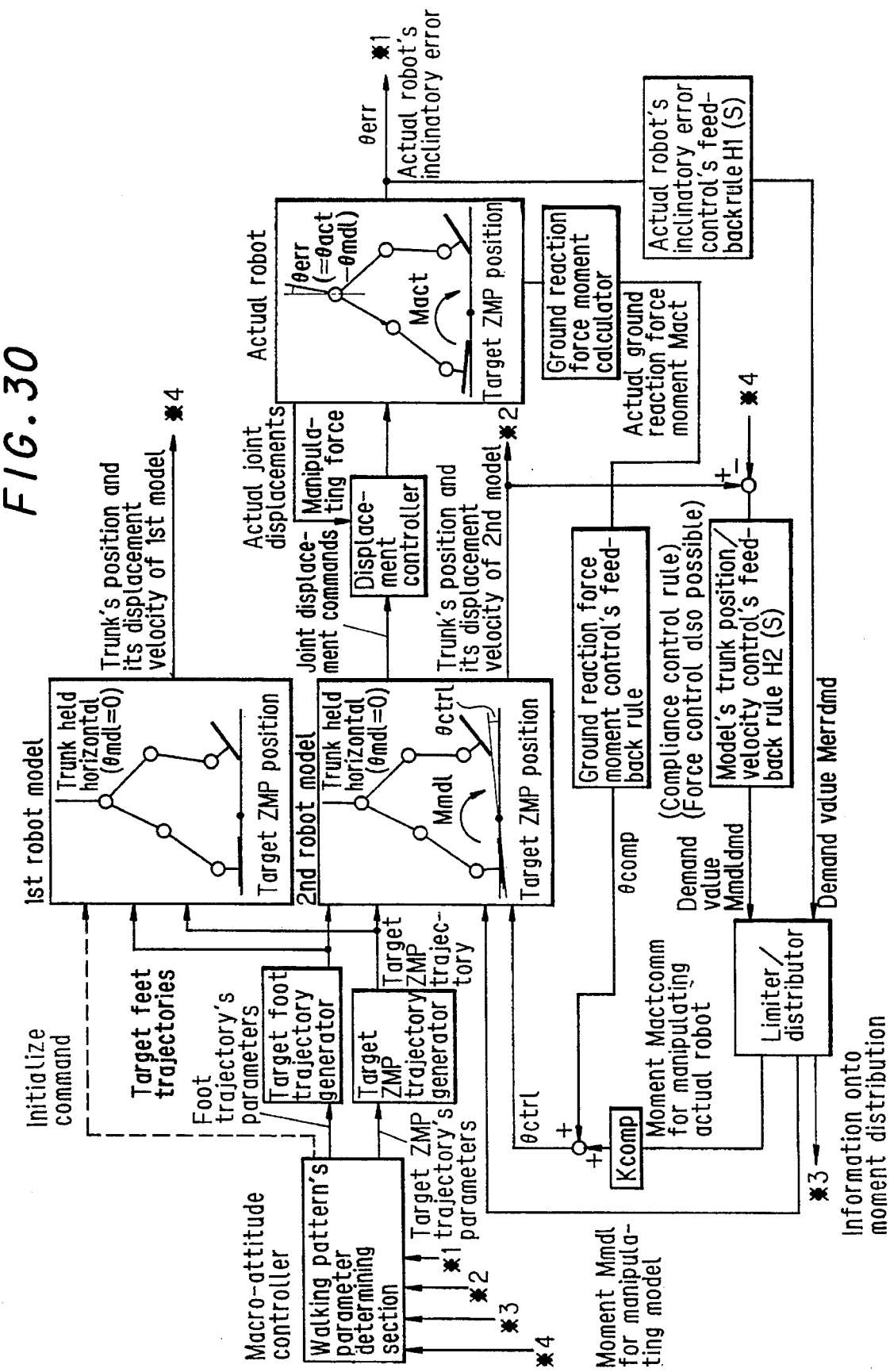
FIG. 30 is a block diagram showing the control according to a sixth embodiment of the invention.

FIG. 30 is a diagram showing the control according to a sixth embodiment of the invention. The sixth embodiment combines the controls of the fourth and fifth embodiments for achieving model's attitude stabilization. In the sixth embodiment, the restriction of the angular momentum, the position of the center of gravity and other macro-state quantities of the second model within certain ranges is achieved against instantaneous and minute disturbances mainly by controlling the moments applied to the actual robot and the second model, and is achieved against large disturbances of long duration mainly by controlling the change in footfall's position and time.

At the transition between walking patterns, the first model is matched to the state of the second model. (In other words, at the beginning of the walking pattern of each walking step the initial state of the first model is forcibly adjusted to the state of the second model at that time.) Unless this is done, a problem arises when the inclinatory error of the actual robot relative to the second model is made large by a large disturbance of long duration acting on the actual robot. Specifically, when a large amount of the moment Mactcomm is applied to the second model for correcting the inclinatory error, the control for converging the attitude error between the first and second models does not produce adequate results, so that the attitude error between the first and second models diverges. If the initial state of the first model is rapidly matched to the second model, however, the manipulated variable for converging the attitude error between the first and second models is liable to change abruptly. The feedback gain of the control for converging the attitude error between the first and second models should therefore preferably be continuously reduced just before the transition from one walking pattern to the next.

In the fourth embodiment, the accuracy with which the future behavior of the model can be predicted is degraded by the fact that the behavior of the model becomes unpredictable when the actual robot is subjected to an unpredictable disturbance. In the sixth embodiment, the second model is converged on the behavior of the first model within the period of each walking step. Since the behavior of the first model is not affected by a disturbance acting on the actual robot within a single walking step, the behavior of the first model can be predicted with certainty. Thus, even if the behavior of the second model changes because of a disturbance acting on the actual robot, it will soon be converged on the behavior of the first model and, as a result, the unpredictability of the second model's behavior is reduced. In other words, in the sixth embodiment, the manipulation of the footfall position and other walking pattern's parameters produce a more reliable attitude stabilization effect than it does in the fourth embodiment.

Figure 31:
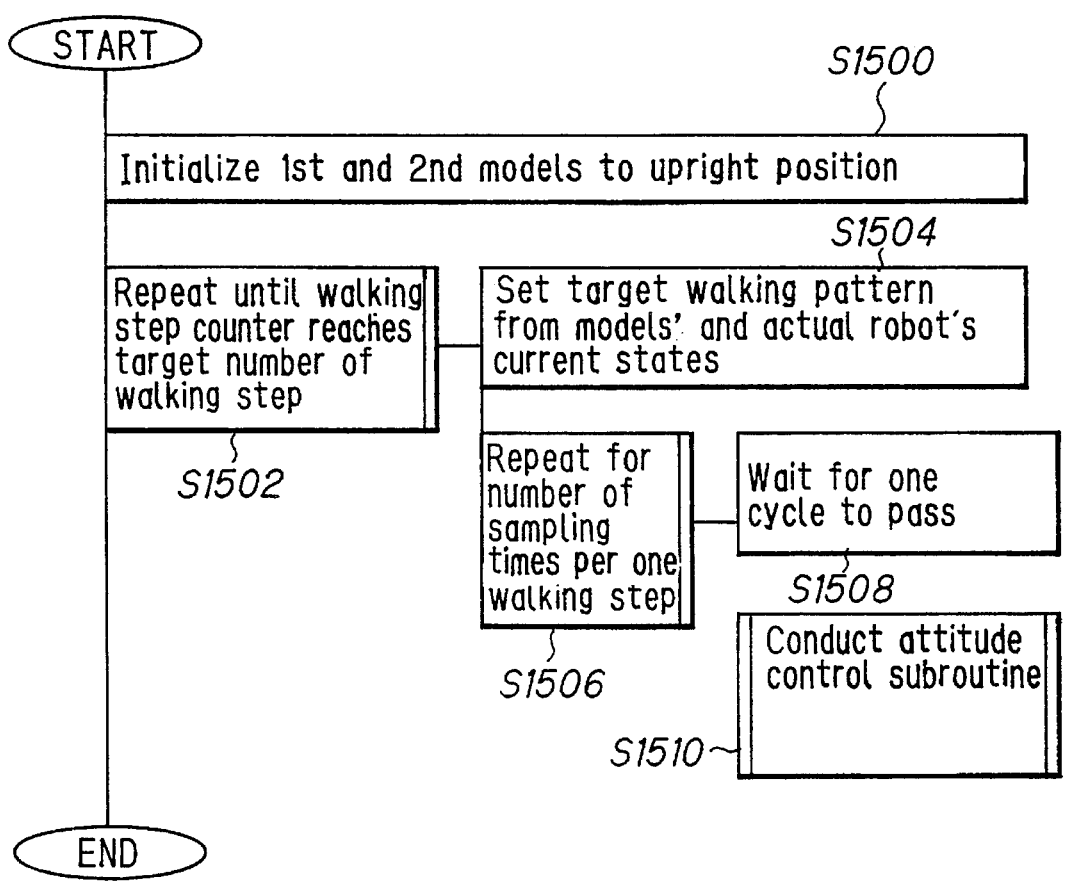
FIG. 31 is a flow chart showing a main routine of the control of FIG. 30.
Figure 32:
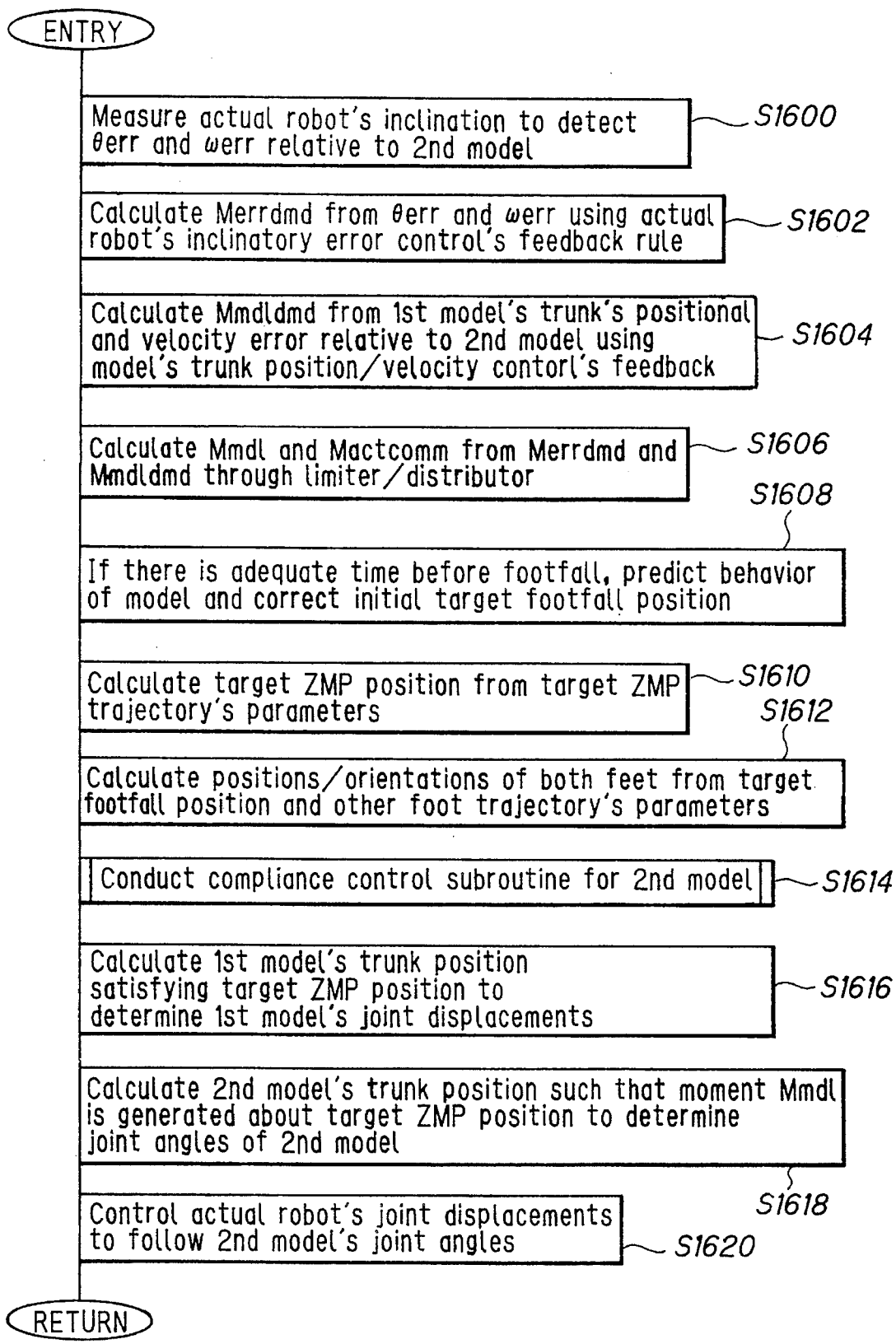
FIG. 32 is a flow chart showing a subroutine of attitude control procedures of FIG. 31.
Figure 33:
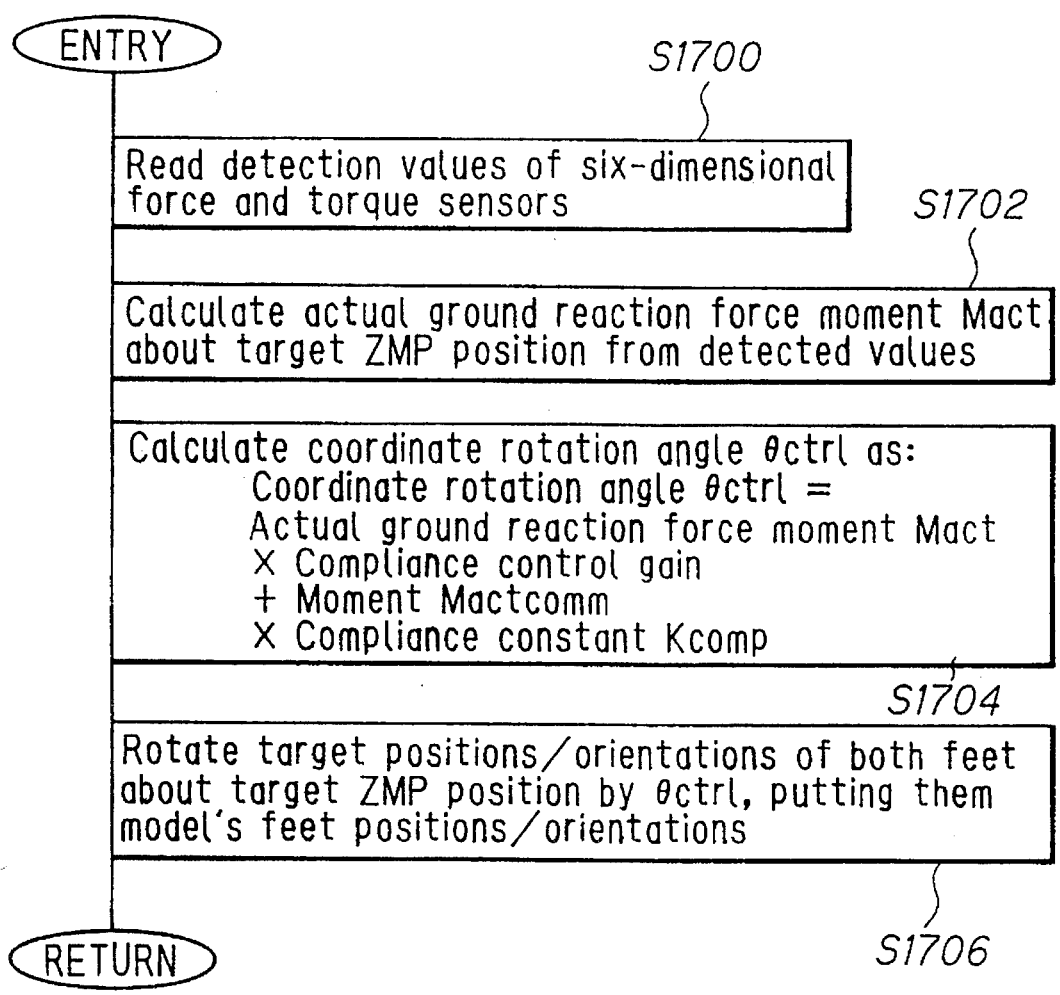
FIG. 33 is a flow chart showing a subroutine of compliance control procedures of FIG. 32.

Steps S1500 to S1510 of FIG. 31 make up the main routine, steps S1600 to S1620 of FIG. 32 a subroutine of the attitude control procedures of the main routine, and steps S1700 to S1706 of FIG. 33 a subroutine of the compliance control procedures of the main routine of the sixth embodiment.

Since the unpredictability of the model's future behavior is reduced more in the sixth embodiment than in the fourth, more reliable long-term attitude stabilization can be realized.

In the foregoing, it was explained in the sixth embodiment that the error between the first and second models is forcibly made zero at the transition between walking patterns. It is also possible to apply the moment to the first model for converging the error between the first and second models on zero at other times when the error becomes large. When the moment is applied to the first model, however, the resulting error of the trunk's position tends to destabilize the attitude of the first model. This attitude destabilization can be prevented by correcting the footfall position and other walking pattern parameters at the same time as applying the moment to the first model. If the footfall position or time is greatly changed immediately before footfall, however, the leg's behavior changes abruptly. Thus the acceptable amount of change in the footfall position and time grows smaller as the amount of time before footfall decreases. Therefore, when the moment is applied to the first model and the footfall position or the like is corrected accordingly, it is preferable to reduce the maximum permissible amount of the moment to be applied as the time to footfall grows shorter.

Further, the dynamic models of the fifth and sixth embodiments are configured in two stages. It is also possible to increase the number of model stages to three or more and control the error between the actual robot and the models and the error among the models. The higher the level of the model (i.e. the more remote the model is from the actual robot among the tandem models), the less it is affected by disturbances acting on the actual robot and, accordingly, the higher is its behavior prediction's accuracy. Therefore, if the footfall's positional correction amount is calculated on the basis of the behavior of the higher level model, it will be possible to secure the attitude stability of the higher level model and, moreover, since the control of the moment of a lower level model causes it to follow the model above it, it becomes possible as a result to ensure the attitude stability of the actual robot and all the models. The same applies when perturbation models are used.

Some additional explanation will now be given regarding the limiter and distributor used in the second embodiment and the like. The purpose of the limiter and distributor is to distribute the manipulated variables Mmdl and Mactcomm while maintaining the ground contactability of the actual robot. The limiter is not restricted to that mentioned in connection with the second embodiment. The following modified arrangements can also be used, alone or in combinations.

a. Placing a prescribed limit on the manipulated variables calculated by the control rule in terms of moment.
b. Varying the limit value of the manipulated variables calculated in terms of moment in accordance with the actual or designed value of the component of the ground reaction force vertical (normal) to the ground.

In this case, since Error amount of ZMP=Moment/Vertical component of ground reaction force the best ground contactability is obtained by varying the limiter as a function of the product obtained by multiplying the distance from the target ZMP position to the boundary of the ZMP permissible region by the vertical component of the ground reaction force.

c. Varying the limit value of the manipulated variables calculated in terms of moment based on the distance from the target ZMP position to the boundary of the ZMP permissible region.

Since the ZMP permissible region is large during two-leg support periods during level ground walking, this arrangement enables the production of a large restoration force in the actual robot.

d. Once converting the manipulated variables calculated by the control rule to positional error of the ZMP and limiting the result according to the distance from the target ZMP position to the boundary of the ZMP permissible region.
e. In the case where the manipulated variables are calculated by the PD control rule, applying a limit to the manipulated variables calculated from the P component and not applying a limit to a D component exhibiting an oscillation damping effect, or vice versa.
f. As regards the manipulated variable of the moment Mactcomm, passing the moment Mactcomm through a limiter whose limit value can be varied in accordance with the actual ground reaction force moment Mact, so as to prevent Mact from exceeding its limit value.
g. As regards the same variable, multiplying any excess of Mact over its limit value by a gain and subtracting the product from the moment Mactcomm.
h. Also as regards the same variable, calculating the ZMP position of the actual robot from the detected actual robot's ground reaction force and not increasing the absolute value of the moment Mactcomm further if the calculated ZMP position of the actual robot is likely to move outside the ZMP permissible region.

It is also possible to use simple proportional distribution for the distribution, as shown by Eq. 24.

$$Mactcomm=a\cdot Merrdmd+Mmdldmd \quad Mmdl=(a-1)\cdot Merrdmd+Mmdldmd \qquad \text{Eq. 24}$$

where a is constant.

The distribution can also be conducted as a function of the frequency band. For example, if the moment Mactcomm is applied only with the high-frequency components of the demand values Merrdmd and Mmdldmd, and the low-frequency component thereof is applied to the moment Mmdl, the variable for manipulating the ground reaction force of the actual robot will be held to a low value even without passing it through a limiter and, as a result, the ground contactability will be enhanced.

Furthermore, in the second embodiment, the manipulated variables are obtained by calculating the demand value(s) by the feedback rule and then passing through the limiter and distributor. However, the order of these procedures can be reversed or the limiter can be inserted on either side of the distributor.

Some additional explanation will now be given regarding the walking pattern referred to in the description of the first to sixth embodiments. The walking pattern is ordinarily described in terms of constraint conditions including the conditions relating to the ground reaction force required for securing ground contact, and the joint displacements are determined to satisfy the described conditions. As the constraint conditions there are used the foot trajectories, the trunk's orientation, an equation for determining the height of the trunk that does not cause unreasonable joint displacement's behavior, and the like. A typical condition regarding the ground reaction force is, for example, the ZMP permissible region (the region within which it is permissible for the ZMP to exist) during level ground walking. The ZMP permissible region is the minimum convex polygon including the ground contact surface. The target ZMP trajectory is established within this region and the walking pattern is generated so that the ZMP kinematically calculated from the walking pattern by use of an Euler-Newton equation or the like coincides with the target ZMP trajectory. Instead of conditions relating to the ground reaction force, it is possible to use conditions relating to the force or moment acting on a specified point such as the ankle. This is possible because during a one-leg support period in a biped walking robot, for example, the fact that the ankle of the supporting leg is near the ground means that the ankle torque is closely related to the ground reaction force moment acting on the point of vertical projection of the ankle on the ground.

Moreover, in the dynamic model it is necessary to calculate the model behavior which satisfies the target ground reaction force conditions. By "target ground reaction force conditions" is meant, for example, the generation of the moment Mmdl. Since the model's foot positions/orientations and the trunk's orientation are supplied from the walking pattern generator, however, in the illustrated embodiment relating to the robot whose legs each have six degrees of freedom, the displacements of all joints are determined once the trunk's orientation has been decided. Of the trunk's positional parameters, the height is, for example, decided such that the instantaneous displacement or its velocity or its acceleration etc. of the knees or other joints does not exceed the capability of the actuators and that the reaction force normal to the ground does not become negative. The target ground reaction force conditions are therefore satisfied by the remaining trunk's positional parameters, namely the fore/aft and left/right behaviors. However, owing to the difficulty of direct, analytical calculation of trunk's fore/aft and left/right positions that satisfy the target ground reaction force conditions at each instance, the actual approach used is to impart positions to the trunk, calculate the resulting ground reaction force, and then use the newton method or other such converging method of approximation to search for the trunk's position that satisfies the target ground reaction force. If high-speed computation is important, the number of search cycles can be limited, although this introduces some amount of error. In the extreme, the number of search cycles can be reduced to one.

During two-leg support periods, ground contactability is not degraded even if the moment Mact is large. During such periods it is therefore possible to increase the limiter's limit value or to raise the gain of the model trunk's positional control rule and the like.

On the other hand, if the walking environment or purpose makes attitude control particularly important, it may become necessary to stress the accuracy of the footfall position. This is the case during walking on stairs or stepping stones, for example. In such situations, making the control gains variable makes it possible to realize the degree of control precision made necessary by the particular circumstances. If the emphasis is on attitude stability, for example, the gain of the model trunk's positional (or inclinatory) control is lowered to reduce the demand value Mmdldmd and the control for converging the model's inclination (or the model trunk's position) on zero is achieved mainly by correcting the footfall position and other walking parameters. This method is useful because by reducing moment Mactcomm so that the actual robot's ZMP position moves near the center of the ZMP permissible region, it increases the margin of stability. It should be noted, however, that the footfall position's accuracy is degraded because footfall position and other walking pattern parameters are drastically modified. Depending on the walking environment and purpose, it is also possible to achieve precision control appropriate for the circumstances by adjusting the frequency characteristics of the control rules' gain.

Although the first to sixth embodiments described in the foregoing use the compliance control as the actual robot's ground reaction force moment's feedback control, it is also possible to use torque control instead. In cases where the ground configuration is known and little disturbance arises owing to ground irregularities (bumps and recesses) or cases where compliance is achieved mechanically, there is no particular need to conduct the ground reaction force moment's feedback control. Even if it is not conducted, there is no loss of the advantage of the invention.

While the invention was described with reference to a biped walking robot as an example of the legged mobile robot, the invention can be applied not only to a legged robot other than the biped one, but also any other robots of wheeled or crawler type.

Furthermore, the invention has thus been shown and described with reference to the specific embodiments. However, it should be noted that the present invention is in no way limited to the details of the described arrangements, changes and modifications may be made without departing from the scope of the appended claims.

What is claimed is:

1. A system for controlling stability of a mobile robot, comprising:

model means for providing at least a first mathematical model which describes a behavior of the mobile robot under a restraint condition and which outputs a desired behavior that satisfies dynamic equilibrium of the mobile robot in response to inputs including a virtual input;

behavior detecting means for detecting the mobile robot's actual behavior;

first control means for inputting outputs from the model as a reference input, and the detected actual behavior of the mobile robot, as a feedback input, and for outputting at least a manipulated variable of the mobile robot such that an error between the reference input and the feedback input decreases; and second control means for inputting at least one of the output from the model, the manipulated variable and the detected actual behavior of the mobile robot, and for outputting the virtual input to the model, to change the model's output such that the mobile robot becomes stable.

2. A system according to claim 1, wherein the virtual input to the model means is indicative of a shift of a ground reaction force and/or moment acting on the mobile robot.

3. A system according to claim 1, further including;

at least a second mathematical model describing an ideal behavior of the mobile robot; and second means for calculating an error between the behavior described by the first mathematical model and the ideal behavior described by the second mathematical model; and said second control means additionally determines a value of a manipulated variable in response to the error between the behavior described by the first mathematical model and the ideal behavior described by the second mathematical model and supplies the value of the manipulated variable to at least one of the mathematical models such that the behavior of the mathematical model to which the value of the manipulated variable is supplied is modified in response to the value of the manipulated variable such that the error decreases.

4. A system according to claim 3, wherein said second control means determines a second value of a manipulated variable in response to an error calculated between the behavior described by the first mathematical model and the ideal behavior described by the second mathematical model and supplies the second value to the mobile robot to change the posture of the robot.

5. A system according to claim 4, wherein the mobile robot is a legged mobile robot for walking on the ground, and said first and second mathematical models individually describe the desired behavior of the model robot defined in terms of a desired walking pattern established at least with respect to a ground reaction force and/or moment acting on the robot, and sixth means is provided for detecting the actual ground reaction force and/or moment acting on the mobile robot, and said second control means determines the second value of a manipulated variable with respect to an actual ground reaction force and/or moment in response to the error, and seventh means is provided for changing the posture of the mobile robot to decrease any error between the actual ground reaction force or moment acting on the mobile robot and the second value of a manipulated variable.

6. A system according to claim 5, wherein said second control means modifies the desired behavior such that a position and/or timing at which or when the leg of the mobile robot lands is varied such that the mobile robot's behavior becomes stable.

7. A system according to claim 3, wherein the mobile robot is a legged mobile robot walking on the ground, and the first and second mathematical models individually describe the desired behavior of the model robot defined in terms of a desired walking pattern established at least with respect to ground reaction force and/or moment acting on the mobile robot, and said second control means determines the value of a manipulated variable with respect to the ground reaction force and/or moment in response to the error and supplies it to at least one of the first and second mathematical models such that the behavior of the mathematical model to which the value is supplied is modified such that the error decreases.

8. A system according to claim 1, wherein said second control means determines a second value of a manipulated variable in response to the error and supplies the second value of a manipulated variable to the robot to change the posture of the mobile robot.

9. A system according to claim 8, wherein the mobile robot is a legged mobile robot for walking on the ground, and said first mathematical model describes the desired behavior of the mobile robot defined in terms of a desired walking pattern established at least with respect to ground reaction force and/or moment acting on the mobile robot, and fourth means is provided for detecting an actual ground reaction force and/or moment acting on the robot, said second control means determines the second value of a manipulated variable with respect to a detected actual ground reaction force and/or moment in response to the error, and fifth means is provided for changing the posture of the mobile robot to decrease the error between the detected actual ground reaction force or moment acting on the mobile robot and the second value of a manipulated variable.

10. A system according to claim 9, wherein said second control means modifies the desired behavior such that a position and/or timing at which the mobile robot leg lands is varied such that the robot's behavior becomes stable.

11. A system according to claim 1, further including:

third means for detecting an error between a desired ground reaction force and/or moment and the mobile robot's actual force and/or moment; and fourth means for geometrically deforming a posture of the mobile robot described by the first or second mathematical model in response to a detected error between the desired ground reaction force and/or moment and the mobile robot's actual force and/or moment.

12. A system according to claim 1, wherein the mobile robot is a legged mobile robot for walking on the ground, and said first mathematical model describes the desired behavior of the mobile robot defined in terms of a desired walking pattern established at least with respect to ground reaction force and/or moment acting on the mobile robot, and said second control means determines a value of a manipulated variable with respect to the ground reaction force and/or moment and supplies it to the first mathematical model such that the first mathematical model's behavior is modified such that the mobile robot's behavior becomes stable.

13. A system according to claim 1, wherein said constraint condition is determined in such a manner that a portion of the mobile robot has a desired posture changing pattern and said first means detects a deviation from the desired posture changing pattern.

14. A system for controlling stability of a mobile robot, comprising:

generating means for generating an ideal behavior of the mobile robot at least with respect to a ground reaction force and/or moment acting on the mobile robot;

model means for providing at least a first mathematical model describing relationships between a first deviation of the mobile robot's behavior, and a second deviation of the ground reaction force and/or moment without changing a state variable of the ideal behavior;

first means for detecting an error between the state variable of the ideal behavior and the mobile robot's actual behavior;

second means for inputting the error and determining a value of a virtual force and/or moment and supplying the value to the first mathematical model such that the error decreases;

third means including a geometric model for inputting the ideal behavior and the first deviation and modifying the ideal behavior in response thereto, to output a modified behavior; and control means for controlling an actuator of the mobile robot to follow the modified behavior.

15. A system according to claim 14, wherein the mobile robot is a legged mobile robot, and said first means detects at least an inclination error of the mobile robot as the error.

16. A system according to claim 15, further including:

detecting means for detecting a second error between an ideal ground reaction force and/or moment and an actual ground reaction force and/or moment acting on the mobile robot; and modifying means for modifying a posture described by the first mathematical model in response to the detected second error between the ideal ground reaction force and/or moment and the actual ground reaction force and/or moment acting on the mobile robot.

17. A system according to claim 14, wherein said mobile robot is a legged mobile robot and said third means additionally modifies the ideal behavior such that a position or timing at which or when the mobile robot's leg is to land is varied in response to at least one of the first deviation, the second deviation, and the error such that the mobile robot's stability is enhanced.

18. A system according to claim 17, wherein said second means additionally determines a value of a manipulated variable with respect to a ground reaction force and/or moment acting on the mobile robot and supplies the value to the mobile robot such that the mobile robot's stability is enhanced.

19. A system according to claim, 17, further including detecting means for detecting a second error between an ideal ground reaction force and/or moment and an actual ground reaction force and/or moment acting on the mobile robot; and means for modifying a posture described by the first mathematical model in response to the detected second error between the desired ground reaction force and/or moment and the actual ground reaction force and/or moment acting on the mobile robot.

20. A system according to claim 14, wherein said second means additionally determines a value of a manipulated variable with respect to a ground reaction force and/or moment acting on the mobile robot and supplies the value to the mobile robot such that the mobile robot's stability is enhanced.

21. A system according to claim 14, further including fourth means for detecting a second error between an ideal ground reaction force and/or moment acting on the mobile robot and an actual ground reaction force and/or moment acting on the mobile robot; and fifth means for modifying a posture described by the first mathematical model in response to the detected second error between the ideal ground reaction force and/or moment and the the actual ground reaction force and/or moment acting on the mobile robot.

22. A system for controlling attitude stabilization of a legged mobile robot having a trunk and a plurality of legs each connected to the trunk and walking on the ground; comprising;

generating means for generating a desired walking pattern of the mobile robot in such a manner that a ground reaction force and/or moment acting on the mobile robot, when the robot's leg comes into contact with the ground, is at least a desired position;

a first mathematical model made up of an inverted pendulum having a pivot point and simulating dynamics of the mobile robot;

a second mathematical model simulating the trunk and legs of the mobile robot such that the second model is assumed to walk on the ground in accordance with the desired walking pattern;

first means for detecting an inclinatory error of the mobile robot relative to the second model;

second means for determining a manipulated variable in terms of a moment in response to the detected inclinatory error and supplying the manipulated variable to the first model such that the inverted pendulum of the first model is rotated about its pivot point by an amount corresponding to the manipulated variable;

third means for detecting positional variation of an upper portion of the inverted pendulum resulting from the rotation and correcting the motion of the second model in response to a detected positional variation; and control means for controlling joints of the mobile robot such that the mobile robot follows the motion of the second model.

23. A system according to claim 22, further including:

fourth means for detecting a positional error between the desired position and an actual position of the ground reaction force or moment; and said third means additionally corrects the motion of the second model in response to the detected positional error.

24. A system according to claim 23, wherein said second means determines a second manipulated variable in terms of the ground reaction force and/or moment and supplies it to the second model such that the mobile robot's attitude stabilization is enhanced.

25. A system according to claim 23, wherein said second means determines the second manipulated variable less than a predetermined limit value.

26. A system according to claim 22, wherein said third means additionally corrects the motion of the second model such that a position at which the mobile robot's leg is to be landed is varied in response to the detected positional variation such that the mobile robot's attitude stabilization is enhanced.

27. A system according to claim 22, wherein said second means determines a second manipulated variable in terms of the ground reaction force and/or moment and supplies it to the second model such that the mobile robot's attitude stabilization is enhanced.

28. A system according to claim 22, wherein said second means determines the manipulated variable less than a predetermined limit value.

29. A system according to claim 22, wherein the first and second models are prepared independently.

30. A system according to claim 22, wherein the first and second models are combined to be a composite model.

31. A system according to claim 30, wherein the said first means detects an inclinatory error of the trunk between the models.

32. A system according to claim 22, wherein the desired walking pattern is defined in terms of positions and orientations of the trunk and distal end of the legs.

33. A system according to claim 22, wherein the mobile robot is a biped robot.

34. A system for controlling stability of a mobile robot comprising:

generating means for generating an ideal behavior of the mobile robot at least with respect to an ideal ground reaction force and/or moment acting on the mobile robot;

first model means for providing a first mathematical model made up of an inverted pendulum and describing dynamics of a first deviation of the mobile robot's behavior and a second deviation of a ground reaction force and/or moment without changing a state variable of the ideal behavior;

second model means for providing a second mathematical model describing kinematics and a posture of the mobile robot such that the second model is assumed to move on the ground;

first means for detecting a behavior error between the model robot and the second model;

second means for determining a value of a virtual force and/or moment in response to the detected behavior error and supplying the value to the first model such that the inverted pendulum is rotated by an amount corresponding to a determined value of the virtual force and/or moment;

third means for changing a posture of the second model in response to a displacement of the inverted pendulum; and control means for controlling an actuator of the mobile robot such that the mobile robot follows the motion of the second model whereby the detected behavior error is decreased.

35. A system according to claim 34, further including:

fourth means for detecting an error between the ideal ground reaction force and/or moment and the mobile robot's actual ground reaction force and/or moment; and fifth means for changing the posture of the second model in response to the detected error between the ideal ground reaction force and/or moment and the mobile robot's actual ground reaction force and/or moment.

36. A system according to claim 35, wherein said second means additionally determines a value of a manipulated variable with respect to the ground reaction force and/or moment and supplies it to seventh means, and said seventh means detects a difference between the value of a manipulated variable and the mobile robot's actual ground reaction force and/or moment, and said seventh means changes the posture of the second model in response to the detected difference such that the mobile robot's stability is enhanced.

37. A system according to claim 36, wherein said second means determines the value of a manipulated variable within a predetermined limit value.

38. A system according to claim 36, wherein eighth means is provided for adding the value of a manipulated variable to an ideal ground reaction force and/or moment to modify the ground reaction force and/or moment and to obtain a difference between the modified ground reaction force and/or moment and the mobile robot's actual ground reaction force and/or moment.

39. A system according to claim 34, wherein said mobile robot is a legged mobile robot and sixth means is provided for modifying the ideal behavior such that a position or timing at which or when the mobile robot's leg is to be landed is varied in response to at least one of the displacement of the pendulum, the error between the ideal ground reaction force and/or moment, and the detected behavior error between the mobile robot and the second model such that the mobile robot's stability is enhanced.

40. A system according to claim 34, wherein the first and second models are prepared independently.

41. A system according to claim 34, wherein the first and second models are combined to be a composite model.

42. A system according to claim 34, wherein said first means detects an inclination error of the trunk between the robot and the second model.

43. A system according to claim 34, wherein said mobile robot is a legged mobile robot and the desired behavior is a desired walking pattern defined in terms of positions and orientations of the trunk and distal ends of the legs.

44. A system according to claim 34, wherein the mobile robot is a biped robot.

45. A system according to claim 36, wherein said third means modifies the desired behavior such that a position and/or timing at which or when the leg of the mobile robot lands is varied such that the mobile robot's behavior becomes stable.

* * * * *

UNITED STATES PATENT AND TRADEMARK OFFICE
CERTIFICATE OF CORRECTION

PATENT NO. : 5,459,659
DATED : October 17, 1995
INVENTOR(S) : Takenaka

It is certified that error appears in the above-indentified patent and that said Letters Patent is hereby corrected as shown below:

Column 26, line 59, after"claim" delete the comma.

Column 27, line 16, delete "the the actual" and substitute -- the actual --.

Signed and Sealed this

Twenty-ninth Day of July, 1997

Attest:

Attesting Officer

BRUCE LEHMAN

Commissioner of Patents and Trademarks